(12) United States Patent
Kim

(10) Patent No.: US 9,318,927 B2
(45) Date of Patent: Apr. 19, 2016

(54) AMORPHOUS STATOR, AND ELECTRIC MOTOR USING SAME

(75) Inventor: Byoung Soo Kim, Anyang-si (KR)

(73) Assignee: AMOTECH CO., LTD. (KR)

( * ) Notice: Subject to any disclaimer, the term of this patent is extended or adjusted under 35 U.S.C. 154(b) by 448 days.

(21) Appl. No.: 13/981,156

(22) PCT Filed: Jan. 19, 2012

(86) PCT No.: PCT/KR2012/000465
§ 371 (c)(1),
(2), (4) Date: Aug. 9, 2013

(87) PCT Pub. No.: WO2012/102517
PCT Pub. Date: Aug. 2, 2012

(65) Prior Publication Data
US 2013/0313922 A1    Nov. 28, 2013

(30) Foreign Application Priority Data

Jan. 24, 2011  (KR) .................. 10-2011-0007019
Dec. 23, 2011  (KR) .................. 10-2011-0140748

(51) Int. Cl.
*H02K 3/52* (2006.01)
*H02K 1/12* (2006.01)
*H02K 1/02* (2006.01)
*H02K 1/14* (2006.01)
(Continued)

(52) U.S. Cl.
CPC .................. *H02K 3/522* (2013.01); *H02K 1/02* (2013.01); *H02K 1/12* (2013.01); *H02K 1/148* (2013.01); *H02K 1/185* (2013.01); *H02K 1/187* (2013.01); *H02K 21/12* (2013.01); *H02K 2213/03* (2013.01)

(58) Field of Classification Search
CPC ........... H02K 1/148; H02K 1/02; H02K 1/06; H02K 1/18; H02K 3/522
See application file for complete search history.

(56) References Cited

U.S. PATENT DOCUMENTS 4,255,684 A * 3/1981 Mischler ................ H02K 1/141
174/DIG. 20
4,818,911 A * 4/1989 Taguchi ................ H02K 1/148
310/194

(Continued)

FOREIGN PATENT DOCUMENTS

JP         2008160978    7/2008
KR       1020020063604    8/2002

OTHER PUBLICATIONS

International Search Report—PCT/KR2012/000465 dated Sep. 7, 2012.

*Primary Examiner* — Dang Le
(74) *Attorney, Agent, or Firm* — Cantor Colburn LLP

(57) ABSTRACT

Provided is an amorphous stator for use in a high-power, high-speed electric motor, and an electric motor using the amorphous stator, in which amorphous alloy powder is compressed and molded into a number of unit split cores, to then be assembled with bobbins, and to thus be easily molded into a core of a complex shape, and a core loss is minimized by using the amorphous alloy powder, to thus promote improvement of an efficiency of the motor. The electric motor includes: a stator in which a coil is wound on bobbins respectively formed in a number of unit split cores, and the number of unit split cores are assembled in an annular form by an integral or split bobbin; and a rotor that is rotated by an interaction with the stator, wherein the unit split cores are molded with mixed powder made of plate-shaped amorphous alloy powder and spherical soft magnetic powder.

5 Claims, 15 Drawing Sheets

(51) Int. Cl.
   *H02K 1/18*      (2006.01)
   *H02K 21/12*     (2006.01)

(56) References Cited

U.S. PATENT DOCUMENTS

| | | | |
|---|---|---|---|
| 6,127,760 A * | 10/2000 | Nagasaki | H02K 1/146 |
| | | | 310/194 |
| 7,323,801 B2 * | 1/2008 | Kojima | H02K 1/14 |
| | | | 310/261.1 |
| 7,876,012 B2 * | 1/2011 | Komuro | H02K 1/02 |
| | | | 310/154.35 |
| 8,288,903 B2 * | 10/2012 | Matsuda | H02K 1/148 |
| | | | 310/43 |
| 8,816,542 B2 * | 8/2014 | Kim | H02K 1/18 |
| | | | 310/194 |
| 8,853,910 B2 * | 10/2014 | Sato | H02K 3/522 |
| | | | 310/179 |
| 2004/0119350 A1 * | 6/2004 | Miya | H02K 3/522 |
| | | | 310/71 |
| 2004/0164641 A1 * | 8/2004 | Yamada | H02K 1/148 |
| | | | 310/216.105 |
| 2004/0245882 A1 * | 12/2004 | Horie | H02K 3/325 |
| | | | 310/194 |
| 2007/0114874 A1 | 5/2007 | Ku | |
| 2008/0054737 A1 * | 3/2008 | Inayama | H02K 1/148 |
| | | | 310/44 |
| 2009/0121577 A1 | 5/2009 | Tatematsu et al. | |
| 2009/0273245 A1 * | 11/2009 | Endo | H02K 1/148 |
| | | | 310/44 |
| 2010/0156231 A1 | 6/2010 | Lee et al. | |

* cited by examiner

AMORPHOUS STATOR, AND ELECTRIC MOTOR USING SAME

TECHNICAL FIELD

The present invention relates to an amorphous stator and an electric motor using the amorphous stator, and more specifically, to an amorphous stator for use in a high-power, high-speed electric motor, and an electric motor using the amorphous stator, in which amorphous alloy powder is compressed and molded into a number of unit split cores, to then be assembled with bobbins, and to thus be easily molded into a core of a complex shape, and a core loss is minimized by using the amorphous alloy powder, to thus promote improvement of an efficiency of the motor.

BACKGROUND ART

The slotted stators cause difficult windings, require a lot of time on winding operations, and require complex and expensive coil winding equipment. Also, a structure formed of a number of teeth induces a magnetic discontinuity, to thus affect the efficiency of a motor, and generate a cogging torque depending on the presence of slots. In the case of a material such as an electric steel plate, the thickness of the electric steel plate is thick, to accordingly increase an iron loss, and exhibit the low efficiency in high-speed motors.

Many of devices that are being used in a variety of fields, including the latest technology of high-speed machine tools, air motors, actuators, and compressors, require electric motors exceeding 15,000 to 20,000 rpm, and, in some cases, electric motors that may operate at high speed up to 100,000 rpm. Almost all of the high-speed electric devices are manufactured to have a low magnetic polarity factor. This is to ensure to prevent magnetic bodies in electric devices that operate at high frequencies from having an overly excessive core loss. The main cause is due to the fact that soft magnetic bodies used in most of the motors are composed of Si—Fe alloys. In conventional Si—Fe-based materials, a loss caused by a changing magnetic field at a frequency of about 400 Hz or more may heat the Si—Fe-based materials until the materials cannot be often cooled by even any suitable cooling devices.

Until now, it has been known that it is very difficult to provide electric devices that are easily manufactured while taking the advantages of low-loss materials, at a low-cost. Most of attempts of applying the low-loss materials in the conventional devices have failed. This was due to the reason why the initial designs relied on simple replacement in which conventional alloys such as Si—Fe were replaced by new soft magnetic substances such as amorphous metal, in the magnetic cores of the devices. These electric devices show improved efficiency with low losses, from time to time, but may raise problems of causing a severe deterioration of the output, and big costs related to the handling such as molding of amorphous metal. As a result, commercial success or market entry did not occur.

Meanwhile, the electric motor typically includes a magnetic member formed of a number of stacked laminates of non-oriented electric steel plates. Each laminate is typically formed by stamping, punching, or cutting mechanically soft non-oriented electric steel plates in a desired shape. The thus-formed laminates are sequentially stacked to form a rotor or stator having a desired form.

When compared with the non-oriented electric steel plates, an amorphous metal provides excellent magnetic performance, but has been considered for a long time that it is unsuitable to be used as a bulk magnetic member such as a rotor or stator for electric motors, because of certain physical properties and obstacles that occur at the time of fabrication.

For example, the amorphous metal is thinner and lighter than the non-oriented electric steel plate, and thus a fabrication tool and die will wear more rapidly. When compared with the conventional technology such as punching or stamping, fabrication of the bulk amorphous metal magnetic member has no commercialized competitiveness due to an increase in fabrication costs for the tools and dies. Thin amorphous metal also leads to an increase in the number of the laminates in the assembled member, and also increases the overall cost of the amorphous metal rotor or stator magnet assembly.

The amorphous metal is supplied in a thin, continuous ribbon having a uniform ribbon width. However, the amorphous metal is a very mild material, and thus it is very difficult to cut or mold the amorphous metal. If the amorphous metal is annealed in order to obtain the peak magnetic characteristics, an amorphous metal ribbon is noticeably brittle. This makes it difficult to use conventional methods to configure the bulk amorphous magnetic member, and also leads to a rise in the cost. In addition, embrittlement of the amorphous metal ribbon may bring concerns about the durability of the bulk magnetic member in an application for an electric motor.

From this viewpoint, Korean Patent Laid-open Publication No. 2002-63604 proposed a low-loss amorphous metal magnetic component having a polyhedral shape and a large number of amorphous strip layers for use in high efficiency electric motors. The magnetic component may operate in a frequency range of about 50 Hz to about 20,000 Hz, while having a core loss so as to indicate the enhanced performance characteristics in comparison with the Si—Fe magnetic component that operates in the same frequency range, and has a structure that is formed by cutting an amorphous metal strip to then be formed into a number of cut strips having a predetermined length and laminating the cut strips using epoxy in order to form a polyhedral shape.

However, the Korean Patent Laid-open Publication No. 2002-63604 discloses that brittle amorphous metal ribbon is still manufactured via a molding process such as cutting, and thus it is difficult to make a practical application. In addition, the Korean Patent Laid-open Publication No. 2002-63604 discloses that the magnetic component may operate in a frequency range of about 50 Hz to about 20,000 Hz, but did not propose an application for higher frequency.

Meanwhile, in the case that a high-speed motor of a high output of 100 kW and 50,000 rpm is implemented using silicon steel plates as in drive motors for electric vehicles, an eddy current increases due to high-speed rotation, and thus a problem of generating heat may occur. Also, since the drive motors for electric vehicles are fabricated in a large size, it is not possible to apply the drive motors to the driving system of the in-wheel motor structure, and it is undesirable in terms of increasing weight of the vehicles.

In general, the amorphous strip has a low eddy current loss, but conventional motor cores that are made of laminated amorphous strips may cause it to be difficult to make a practical application due to difficulties of a manufacturing process as pointed out in the prior art, in view of the nature of the material.

As described above, the conventional amorphous strips provides superior magnetic performance compared to non-oriented electrical steel plates, but are not applied as the bulk magnetic members such as stators or rotors for electric motors because of obstacles that occur during processing for the manufacture.

In addition, the conventional method of manufacturing the amorphous soft magnetic core did not present a method of designing a magnetic core optimal in the field of an electric motor with a high-power, high-speed, high-torque, and high-frequency characteristics.

In addition, the need for improved amorphous metal motor members indicating the excellent magnetic and physical properties required for high-speed, high-efficiency electrical appliances is on the rise. Development of manufacturing methods of efficiently using the amorphous metal and practicing mass-production of a variety of types of motors and magnetic members used for the motors is required.

Technical Problem

To solve the above problems or defects, it is an object of the present invention to provide an amorphous stator for use in a high-power, high-speed electric motor, and an electric motor using the amorphous stator, in which amorphous alloy powder is compressed and molded into unit split cores, to thus assemble the unit split cores by using bobbins, instead of coupling the unit split cores mutually directly, and to thereby design a shape of the unit split cores into a simple structure of easy compression molding, and easily achieve core-molding.

It is another object of the present invention to provide an amorphous magnetic component for use in a high-power, high-speed electric motor, and an electric motor using the amorphous stator, in which a mixture of plate-shaped amorphous alloy powder and spherical soft magnetic powder is molded into unit split cores, to thus promote improved permeability and improved packing density, and a core loss is minimized, to thus promote improvement of an efficiency of the motor.

It is still another object of the present invention to provide a high-power, high-speed electric motor having the number of poles that operate in a frequency band of at least 10 kHz or higher so that permeability properties of amorphous alloy materials can be used at maximum.

It is yet another object of the present invention to provide an electric motor in which split cores are coupled closely to each other by using bobbins without increasing magnetoresistance, wherein hinge-coupling is done between adjacent bobbins, to thus employ the split cores even in a single-stator and single-rotor structure and to thus promote effectiveness of coil windings, and minimize the size and weight of the electric motor.

It is still yet another object of the present invention to provide an electric motor in which a number of split cores are coupled by using upper and lower bobbins even in a single-stator and single-rotor structure to thereby enable the spilt cores to be coupled closely to each other and easily form an integral stator core.

It is a further object of the present invention to provide a split-core type stator and an electric motor using the same, in which a number of amorphous split cores made of amorphous alloy powder are easily assembled into an annular shape by using bobbins and annular support brackets, and a bulk molding compound (BMC) for integration is excluded, to thus implement a motor of a single-stator and single-rotor structure capable of improving a heat radiation characteristic.

It is a still further object of the present invention to provide a split-core type stator and an electric motor using the same, in which amorphous metal materials are powdered and are compressed and molded into split cores, to thus easily mold core components of a complex shape, and to thus easily configure a stator that can be used in combination with a single rotor or double rotor, by using a number of molded amorphous split cores.

Technical Solution

To accomplish the above and other objects of the present invention, according to an aspect of the present invention, there is provided an amorphous stator for use in an electric motor, the amorphous stator comprising: a number of unit split core assemblies that are assembled in an annular form, wherein the number of unit split core assemblies comprise: a number of unit split cores that are made in a "T"-shape by compression molding amorphous alloy powder and whose both ends are in contact with each other to form an annular magnetic circuit; insulating bobbins that are formed in the outer periphery of the number of unit split cores, to thus define a coil forming area, in which the number of unit split cores are assembled in an annular form; and a coil that wound on the insulating bobbins.

According another aspect of the present invention, that is also provided an amorphous stator for use in an electric motor, the amorphous stator comprising: a number of unit split core assemblies that are temporarily assembled in an annular form; and an annular support bracket that are coupled at one side surface of the number of the assembled unit split core assemblies, to thus fix the number of the unit split core assemblies, wherein each of the number of unit split core assemblies comprises: a number of unit split cores that are made in an "I"-shape by compression molding amorphous alloy powder; a number of insulating bobbins that comprise inner and outer flanges that are formed in the outer periphery of the number of unit split cores, to thus define a coil winding area, in which a first coupling protrusion and a coupling ring that are formed at both ends of the outer flange interconnect with each other to then be assembled in an annular form, and that are fixed to the outer side of the support bracket by a second coupling protrusion that extends in a direction opposed to the first coupling protrusion and fixed to the inner side of the support bracket by a pair of third coupling protrusions that are formed at both sides of the inner flange; and a coil that wound on the coil winding area of the insulating bobbins.

According another aspect of the present invention, that is also provided an electric motor comprising: a stator in which a coil is wound on bobbins respectively formed in a number of unit split cores, and the number of unit split cores are assembled in an annular form by an integral or split bobbin; and a rotor that is disposed with an interval spaced from and in opposition to the stator in which N-pole and S-pole permanent magnets are alternately mounted on a back yoke, and that is rotated by an interaction with the stator, wherein the unit split cores are molded with mixed powder made of plate-shaped amorphous alloy powder and spherical soft magnetic powder.

Advantageous Effects

As described above, the present invention provides an amorphous stator for use in a high-power, high-speed electric motor, and an electric motor using the amorphous stator, in which amorphous alloy powder is compressed and molded into unit split cores, to thus assemble the unit split cores by using bobbins, instead of coupling the unit split cores mutually directly, and to thereby design a shape of the unit split cores into a simple structure of easy compression molding, and easily achieve core-molding.

In addition, the present invention provides an amorphous magnetic component for use in a high-power, high-speed electric motor, and an electric motor using the amorphous stator, in which a mixture of plate-shaped amorphous alloy powder and spherical soft magnetic powder is molded into unit split cores, to thus promote improved permeability and improved packing density, and a core loss is minimized, to thus promote improvement of an efficiency of the motor.

In addition, the present invention provides a high-power, high-speed electric motor having the number of poles that operate in a frequency band of at least 10 kHz or higher so that permeability properties of amorphous alloy materials can be used at maximum.

In addition, the present invention provides an electric motor in which split cores are coupled closely to each other by using bobbins without increasing magnetoresistance, wherein hinge-coupling is done between adjacent bobbins, to thus employ the split cores even in a single-stator and single-rotor structure and to thus promote effectiveness of coil windings, and minimize the size and weight of the electric motor.

In addition, the present invention provides an electric motor in which a number of split cores are coupled by using upper and lower bobbins even in a single-stator and single-rotor structure to thereby enable the spilt cores to be coupled closely to each other and easily form an integral stator core.

In addition, the present invention provides a split-core type stator and an electric motor using the same, in which a number of amorphous split cores made of amorphous alloy powder are easily assembled into an annular shape by using bobbins and annular support brackets, and a bulk molding compound (BMC) for integration is excluded, to thus implement a motor of a single-stator and single-rotor structure capable of improving a heat radiation characteristic.

In addition, the present invention provides a split-core type stator and an electric motor using the same, in which amorphous metal materials are powdered and are compressed and molded into split cores, to thus easily mold core components of a complex shape, and to thus easily configure a stator that can be used in combination with a single rotor or double rotor, by using a number of molded amorphous split cores.

BEST MODE

The objects, features and advantages of the invention will become apparent through the exemplary embodiments that are illustrated in the accompanying drawings and detailed in the following description. Accordingly, the inventive technological concept can be made by those skilled in the art without departing from the spirit and scope of the invention.

In addition, in the description of the present invention, if it is determined that a detailed description of commonly-used technologies or structures related to the invention may unnecessarily or unintentionally obscure the subject matter of the invention, the detailed description will be omitted. Hereinbelow, preferred embodiments of the present invention will be described in detail the with reference to the accompanying drawings.

Figure 1:
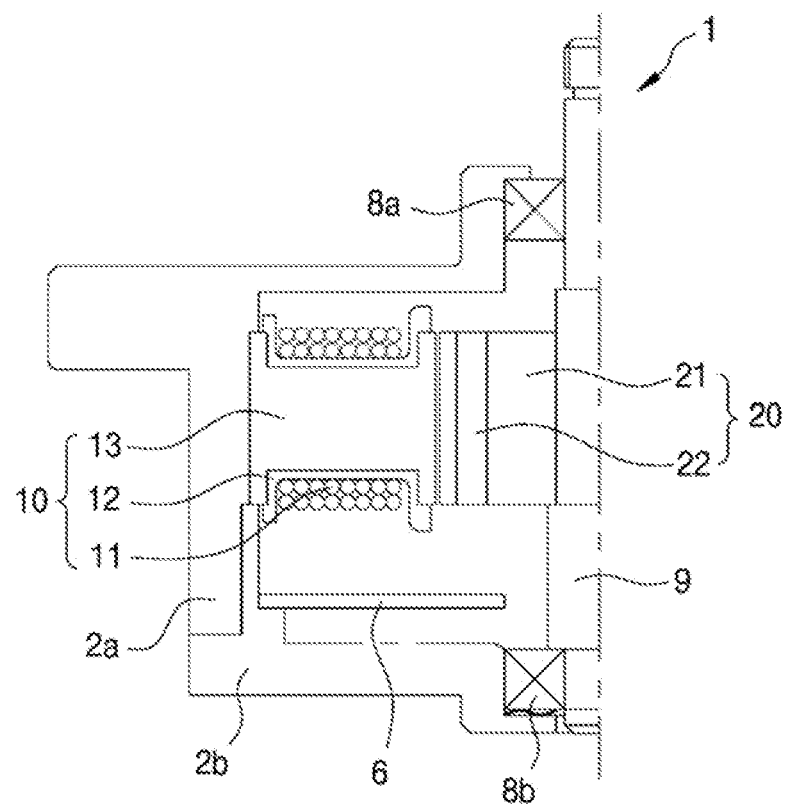
FIG. 1 is an axial cross-sectional view showing an application of a driving motor for an air absorbing device, as a motor including a core of a stator and a back yoke of a rotor in which an integral core stator and an interior permanent magnet (IPM) type rotor are combined with each other in the motor, and in which the core of the stator and the back yoke of the rotor are all molded with amorphous alloy powder according to a first embodiment of the present invention.
Figure 2:
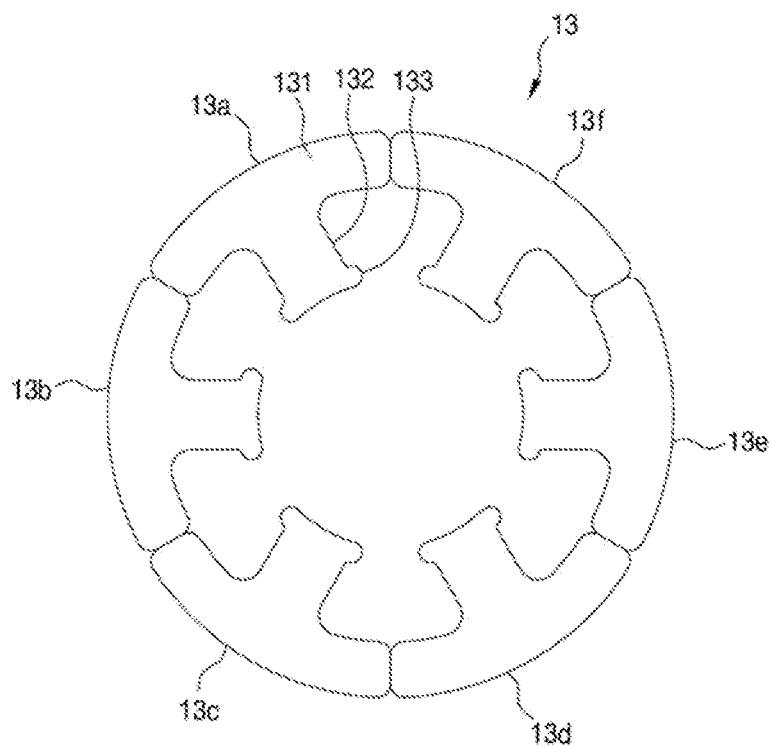
FIG. 2 is a schematic plan view showing a split core type stator core that is configured by using a number of split cores molded with amorphous alloy powder according to the first embodiment of the present invention.
Figure 3A:
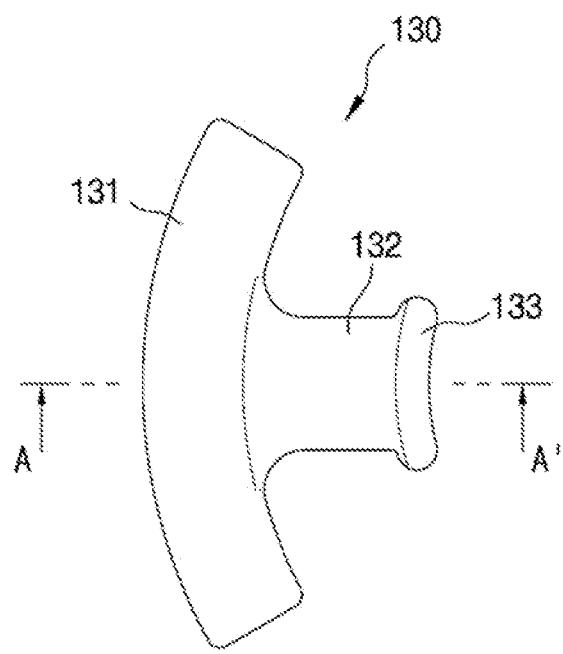
FIGS. 3A and 3B are a plan view of a split core molded with amorphous alloy powder according to the present invention, and shown in FIG. 2, and a cross-sectional view taken along a line A-A' of FIG. 3A respectively.
Figure 3B:
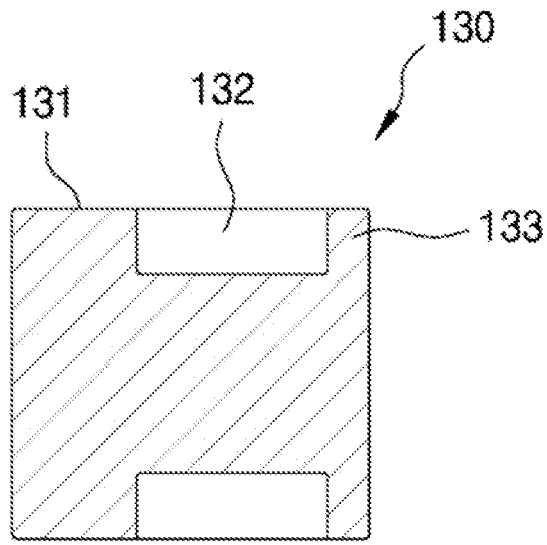
Figure 4:
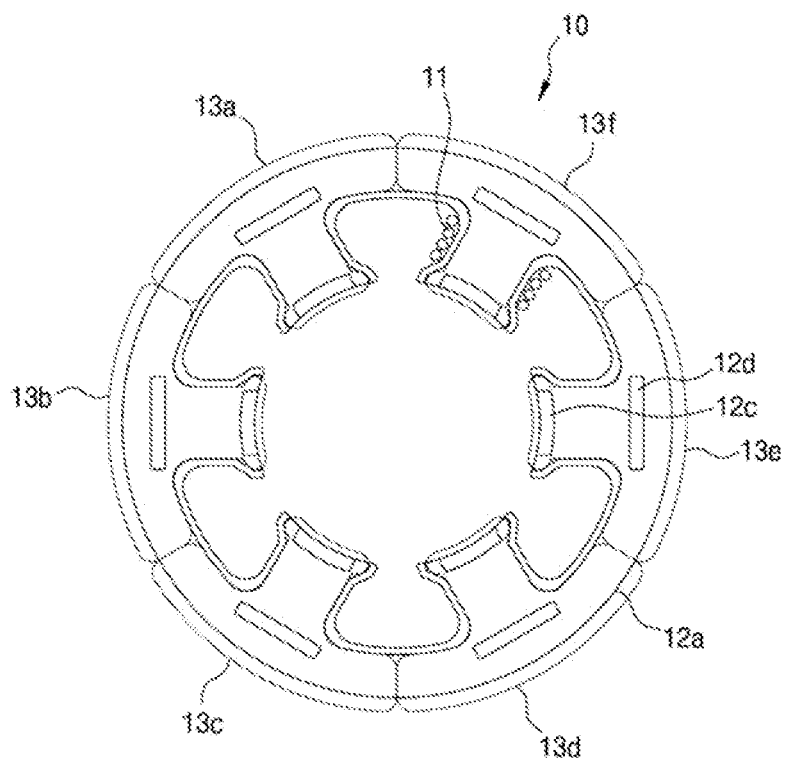
FIG. 4 is a plan view showing that a bobbin is integrally formed with the split core type stator core shown in FIG. 2.
Figure 5:
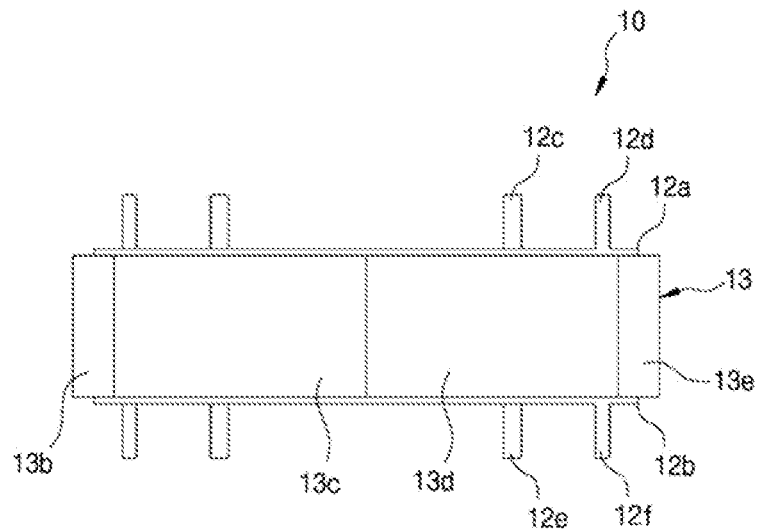
FIG. 5 is a side view of FIG. 4.
Figure 6A:
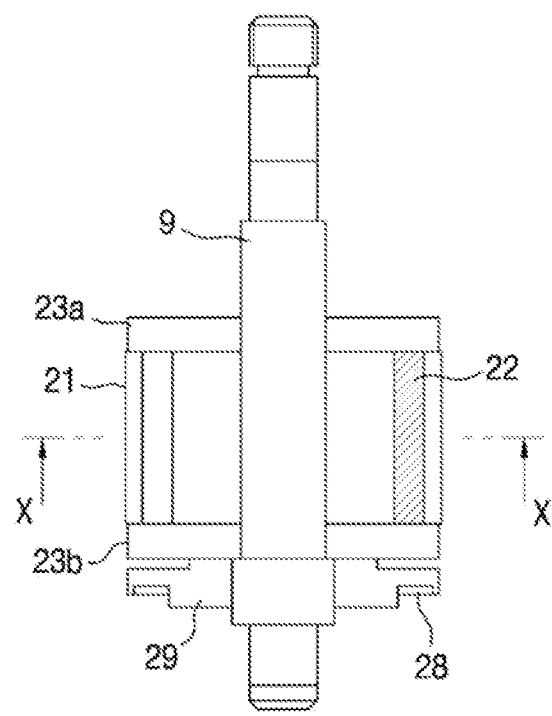
FIGS. 6A and 6B are a front view showing an interior permanent magnet (IPM) type rotor shown in FIG. 1 and a cross-sectional view taken along a line X-X' of FIG. 6A, respectively.
Figure 6B:
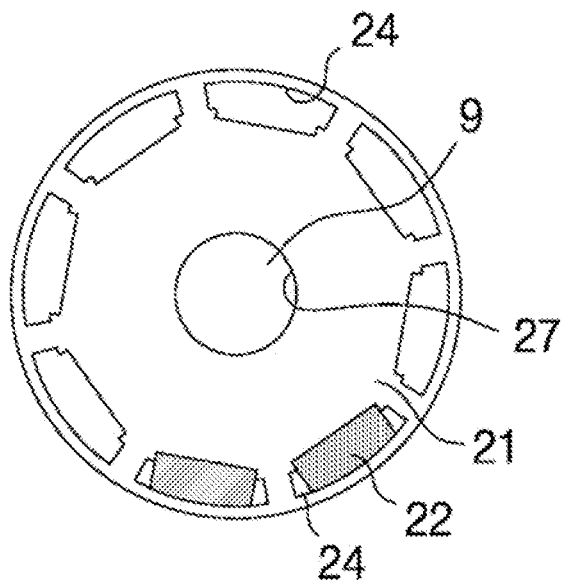

FIG. 1 is an axial cross-sectional view showing an application of a driving motor for an air absorbing device, as a motor including a core of a stator and a back yoke of a rotor in which an integral core stator and an interior permanent magnet (IPM) type rotor are combined with each other in the motor, and in which the core of the stator and the back yoke of the rotor are all molded with amorphous alloy powder according to a first embodiment of the present invention. FIG. 2 is a schematic plan view showing a split core type stator core that is configured by using a number of split cores molded with amorphous alloy powder according to the first embodiment of the present invention. FIGS. 3A and 3B are a plan view of a split core molded with amorphous alloy powder according to the present invention, and shown in FIG. 2, and a cross-sectional view taken along a line A-A' of FIG. 3A respectively. FIG. 4 is a plan view showing that a bobbin is integrally formed with the split core type stator core shown in FIG. 2. FIG. 5 is a side view of FIG. 4. FIGS. 6A and 6B are a front view showing an interior permanent magnet (IPM) type rotor shown in FIG. 1 and a cross-sectional view taken along a line X-X' of FIG. 6A, respectively.

A motor 1 shown in FIG. 1, according to a first embodiment of the present invention, illustrates an application where the motor is applied to a driving motor for an air absorbing device of a vacuum cleaner, in which including a core of a stator and a back yoke of a rotor in which an integral core stator and an interior permanent magnet (IPM) type rotor are combined with each other in the motor, and in which the core of the stator and the back yoke of the rotor are all molded with amorphous alloy powder.

First, the entire motor will be descried below. In the motor 1, first and second bearings 8a and 8b are provided at a housing 2a and a lower cover 2b, respectively, and an upper side of the lower cover 2b is combined with an inner circumferential portion of the housing 2a. Accordingly, a stator 10 is fixedly provided. Here, a rotor 20 is arranged in a space formed at the central portion of the stator 10, and a rotating shaft 9 combined at the central portion of the rotor 20 are rotatably supported by the first and second bearings 8a and 8b.

A control printed circuit board (PCB) 6 is mounted in an inner circumference of the lower cover 2b at a distance from the bottom of the motor 1 in which circuit elements of a driving circuit for applying a driving voltage to the stator 10 are mounted in the control PCB 6.

In the case that the motor 1 is used as an air suction device, at least one through hole may be formed in the housing 2a and the lower cover 2b, in order to introduce air into the motor 1, in which the air is introduced by an impeller that is coupled at the upper portion thereof.

As shown in FIGS. 2, 3A and 3B, the stator 10 includes an amorphous stator core 13 that is configured by using, for example, six "T"-shaped unit split cores 13a-13f molded of amorphous alloy powder.

As shown in FIGS. 3A and 3B, each of six unit split cores 13a-13f constituting an amorphous stator core 13, includes: a yoke 131 that is combined with each other to form an annular outer periphery; and a protruding tooth 133 that protrudes inward from the yoke 131. Here, recesses 132 are formed at the upper and lower portions between the yoke 131 and the tooth 133, as shown in FIG. 3B. It is desirable to form the recesses 132 in terms of reducing the material cost, but it is not essential to have the recesses. Since there are no changes in an area opposing the rotor magnet that is placed on the inside, the cases of having the recesses or no recesses are similar in terms of the magnetic circuit.

In the case that the stator core 13 is configured to have the six unit split cores 130, the yoke 131 of the unit split core 130 is formed of a curved band shape to cover a circumferential angle of 60°, and the distal end of the tooth 133 is extended to have a width wider than the width of the recess 132 at both ends of the tooth 133 to then be formed into a "T"-shaped form.

In the case that the six unit split cores 13a-13f are assembled in an annular form as shown in FIG. 2, six teeth 133 are protruded inward from the annular yoke 131. Six slots are provided between the six teeth 133. Coil 11 is wound on the teeth 133 to magnetically generate N-poles and S-poles of three-phase through the slots.

In addition, in the case that six unit split cores 13a-13f are assembled in an annular form as shown in FIGS. 4 and 5, a bobbin made of an insulating resin 12 is combined for winding a coil 11.

As shown, the bobbin 12 is molded in advance into upper and lower bobbins 12a and 12b and assembled with each other, or integrally formed by insert molding with resin. In this case, the bobbin 12 is not preferably formed on the front end of the tooth 133.

Two pairs of alignment guides 12c-12f that align coils wound on each tooth 133, are protrudingly formed at a distance from one another on the upper and lower surfaces in the bobbin 12. Once a coil 11 is wound on the bobbin 12 by using two pairs of alignment guides 12c-12f in each tooth 133, a stator 10 is completed.

The amorphous stator core 13 of the stator 10 according to the first embodiment, is made up of the six unit split cores 13a-13f or 130, and each of the unit split core 130 includes a yoke 131 that is combined with each other to form an annular outer periphery; and a protruding tooth 133 that protrudes inward from the yoke 131.

Conventional integral stator cores made of general non-oriented electrical steels are configured to have a complex shape that a plurality of teeth having a "T"-shaped form are protruded inward or outward. Since the integral stator cores are configured to have a complex shape although they are compressed and molded with amorphous alloy powder, a desired molding density may be obtained. As a result, the cores do not produce desired permeability, and reduce durability.

However, as shown in FIGS. 2, 3A, and 3B, since each unit split core 130 is small in size, and has a simple shape in the present invention, it can be easily manufactured by compression molding and easily assembled in an annular form by using the bobbin.

Hereinbelow, a method of manufacturing the unit split core by compression molding will be described in detail.

First of all, amorphous alloy is manufactured into an ultra-thin type amorphous alloy ribbon or strip of 30 μm or less by using a rapid solidification processing (RSP) method through a melt spinning process, and then the ultra-thin type amorphous alloy ribbon or strip is pulverized, to thus obtain amorphous alloy powder. Here, the obtained amorphous alloy powder has a size in the range of 1 to 150 μm.

The amorphous alloy powder is classified into amorphous alloy powder with an average powder particle size of 20 to 50 μm, and amorphous alloy powder with an average powder particle size of 50 to 75 μm, through a classification process. Preferably, amorphous alloy powder that is mixed at a weight ratio of 1:1 is used. Here, an aspect ratio of the obtained amorphous alloy powder is preferably set in the range of 1.5 to 3.5.

In this case, the amorphous alloy ribbons or strips may be heat-treated at 400-600° C. in under a nitrogen atmosphere, so as to have a nanocrystalline microstructure that can promote high permeability.

In addition, the amorphous alloy ribbons or strips may be heat-treated at 100-400° C. in the air, to improve the pulverization efficiency.

Of course, it is possible to use spherical powder obtained by an atomization method as the amorphous alloy powder in addition to the pulverization method of the amorphous alloy ribbons or strips.

For example, any one of a Fe-based, Co-based, and Ni-based amorphous alloy may be used as the amorphous alloy. Preferably, a Fe-based amorphous alloy is advantageous in terms of price. A Fe-based amorphous alloy is preferably any one of Fe—Si—B, Fe—Si—Al, Fe—Hf—C, Fe—Cu—Nb—Si—B, and Fe—Si—N. In addition, a Co-based amorphous alloy is preferably any one of Co—Fe—Si—B and Co—Fe—Ni—Si—B.

Thereafter, the pulverized amorphous alloy powder is classified depending on the size of the particle, and then mixed in a powder particle size distribution having optimal composition uniformity. In this case, since the amorphous alloy powder is made up in a plate shape, a packing density is lowered when the amorphous alloy powder is mixed with a binder to then be molded into a shape of components. Accordingly, the present invention uses a mixture of a predetermined amount of spherical soft magnetic powder with plate-shaped amorphous alloy powder, to thus increase the molding density, in which the spherical soft magnetic powder is made of spherical powder particles, to promote improvement of magnetic properties, that is, permeability.

For example, one of MPP powder, HighFlux powder, Sendust powder, and iron powder, or a mixture thereof may be used as the spherical soft magnetic powder that may promote improvement of the permeability and the packing density.

The spherical soft magnetic powder is preferably added in the entire mixed powder in the range of 10 to 50% by weight (wt %). In the case that the spherical soft magnetic powder content is less than 10% by weight, the air gap between amorphous powder grows larger and thus permeability is lowered. As a result, the magnetic resistance of the magnetic components increases, to thus cause efficiency of the electric motor to be low. Meanwhile, in the case that the spherical soft magnetic powder content exceeds 50% by weight, the core loss increases to thereby decrease a Q (loss factor) value.

An aspect ratio of the plate-shaped amorphous alloy powder is preferably set in the range of 1.5 to 3.5, and an aspect ratio of the spherical soft magnetic powder is preferably set in the range of 1 to 1.2. When an aspect ratio of the plate-shaped amorphous alloy powder is less than 1.5, it takes a long time to pulverize the amorphous alloy ribbons or strips. Otherwise, when an aspect ratio of the plate-shaped amorphous alloy powder exceeds 3.5, there is a problem of decreasing the packing density during the molding process. In addition, an aspect ratio of the spherical soft magnetic powder is preferably set in the range of 1 to 1.2 considering an influence upon improvement of the molding density.

A binder mixed in the mixed amorphous alloy powder is, for example, a thermosetting resin such as sodium silicate called water glass, ceramic silicate, an epoxy resin, a phenol resin, a silicone resin or polyimide. In this case, the maximum mixing ratio of the binder is preferably 20 wt %.

The mixed amorphous alloy powder is compressed and molded into a desired shape of cores or back yokes by using presses and molds at a state where binders and lubricants have been added in the amorphous alloy powder. When a compression molding process is achieved by presses, a molding pressure is preferably set to 15-20 ton/cm$^2$.

After that, the molded cores or back yokes are sintered in the range of 300-600° C. for 10-600 min to implement magnetic properties.

In the case that the heat-treatment temperature is less than 300° C., heat treatment time increases to thus cause a loss of productivity, and in the case that heat-treatment temperature exceeds 600° C., deterioration of the magnetic properties of the amorphous alloys occurs.

As described above, when amorphous alloy materials are powdered, compressed, and molded, in the present invention, the entire stator core of a complex shape is not formed but a number of split cores are split and molded and then mutually assembled and integrated by using bobbins to thus be easily manufactured into an integrated amorphous stator core.

In this case, spherical crystalline metal powder of excellent soft magnetic properties is added to the plate-shaped amorphous alloy powder, to thus promote improvement of a magnetic permeability and improvement of a packing density at the time of compression molding.

Meanwhile, the rotor 20 that is disposed in the inner space of the stator 10 in the motor 1 according to the first embodiment of the present invention is configured to have a core whose back yoke 21 is molded with the amorphous alloy powder, and is implemented into an IPM (Interior Permanent Magnet) type structure.

Hereinbelow, the rotor 20 including the back yoke 21 molded with the amorphous alloy powder will be described in detail with reference to FIGS. 6A and 6B.

First of all, referring to FIGS. 6A and 6B, the IPM type rotor 20 according to the present invention includes: a back yoke 21 molded with amorphous alloy powder; an axial bore 27 that is formed in the axial direction at the center of the back yoke 21; eight permanent magnet insertion holes 24 formed along the same circumference at the outer side of the center of the back yoke 21; and eight permanent magnets 22 fitted into the eight permanent magnet insertion holes 24, in which a rotating shaft 9 that rotates with the rotor 20 to thus generate a rotational driving force is combined into the axial bore 27.

The rotor core that forms the back yoke 21 may be molded with the same material and method as those of the stator core 13. Circular non-magnetic bodies, for example, balance weights 23a and 23b made of SUS or Cu, are attached on the top and bottom of the rotor 20, in which the balance weights 23a and 23b are used to prevent the leakage of the magnetic flux in the axial direction, and simultaneously to prevent a permanent magnet 22 inserted into the back yoke 21 and escape eccentricity from taking place, during rotation at high speed. The balance weights 23a and 23b are used to remove eccentricity by giving fine grooves to the outer surface when eccentricity is made during high-speed rotation of the rotor 20.

A sensing magnet bracket 29 for fixedly combining a sensing magnet 28 is formed at the lower portion of the balance weight 23b, and the sensing magnet 28 is combined on the lower surface of the sensing magnet bracket 29.

The permanent magnet 22 is preferably implemented by using Nd magnets with a high magnetic flux density, and is magnetized in the radial direction of the rotor 20 to thus form an anode, to thus generate a permanent magnet torque by interaction between the magnetic flux by the permanent magnet 22 and the rotating magnetic field formed by the current flowing in the coil 11 of the stator 10.

In addition, in the rotor 20 of the present invention, the outer circumferential surface of the permanent magnet insertion hole 24 through which the permanent magnet 22 is inserted is set to have the same curvature as that of the back yoke 21, the inner side surface thereof opposing the outer circumferential surface is formed to have a linear shape, and both side surfaces thereof are formed to have a partially blank space through which the permanent magnet 22 is not inserted so that a small spacer that prevents leakage of the magnetic flux is protrudingly formed at the respective side direction. In this case, the length of the spacer in the diameter direction thereof is formed relatively shorter than the length of the portion through which the permanent magnet 22 is inserted.

Furthermore, the outer circumferential surface of the permanent magnet 22 according to the present invention is set to have the same curvature as that of the permanent magnet insertion hole 24, the inner side surface thereof opposing the outer circumferential surface is formed to have a linear shape, while having a shape corresponding to the permanent magnet insertion hole 24, and both side surfaces thereof are formed to have a bar shape set at right angles to the inner surface thereof. Thus, the permanent magnet 22 inserted into the permanent magnet insertion hole 24 is configured to have a limited movement of the circumferential direction and the radial direction.

As described above, the outer circumferential surface of the respective permanent magnets 22 in the present invention, is formed relatively longer than the length of the inner circumferential surface thereof and both side surfaces thereof are formed to have a small spacer that prevents leakage of the magnetic flux. As a result, a line of magnetic force diverged from each of the permanent magnets 22 and a line of magnetic force converged to each of the permanent magnets 22 have been modified to have uniformly distributed patterns.

As a result, the IPM type motor 1 according to the present invention uniformalizes distribution of the magnetic flux density in the air gap between the rotor 20 and the stator 10, to thereby improve the efficiency of the motor, as well as reduce torque ripple.

The permanent magnet insertion hole 24 is placed as close as possible to the outer circumferential surface of the back yoke 21, to thereby increase an amount of the magnetic flux diverged from the permanent magnet and to promote an increase in torque.

The IPM type rotor 20 may be implemented to have the high power of 2,400 W at 40,000 RPM in a BLDC manner, to thus be able to be applied in vacuum cleaners, electric cars, etc.

Also, in the description of the embodiment, the case where the IPM (Interior Permanent Magnet) type rotor is coupled with the stator has been described considering rotation of a high speed, but it is also possible to use a SPM (Surface Permanent Magnet) type rotor.

Since the shape of the back yoke 21 is simple in the present invention, the back yoke 21 with a high molding density can be easily prepared by compression molding the amorphous alloy powder, to thereby obtain the IPM type rotor 20.

In the stator according to the first embodiment, a number of unit split cores are implemented by using an integral bobbin so as to be used in combination with a single rotor, but the present invention is not limited thereto. It is possible to increase the winding efficiency by preparing a number of complete split-type unit split cores and split type bobbins and then winding a coil thereon.

Hereinbelow, a split core type stator according to a second embodiment of the present invention will be described with reference to FIGS. 7A to 8B.

Figure 7A:
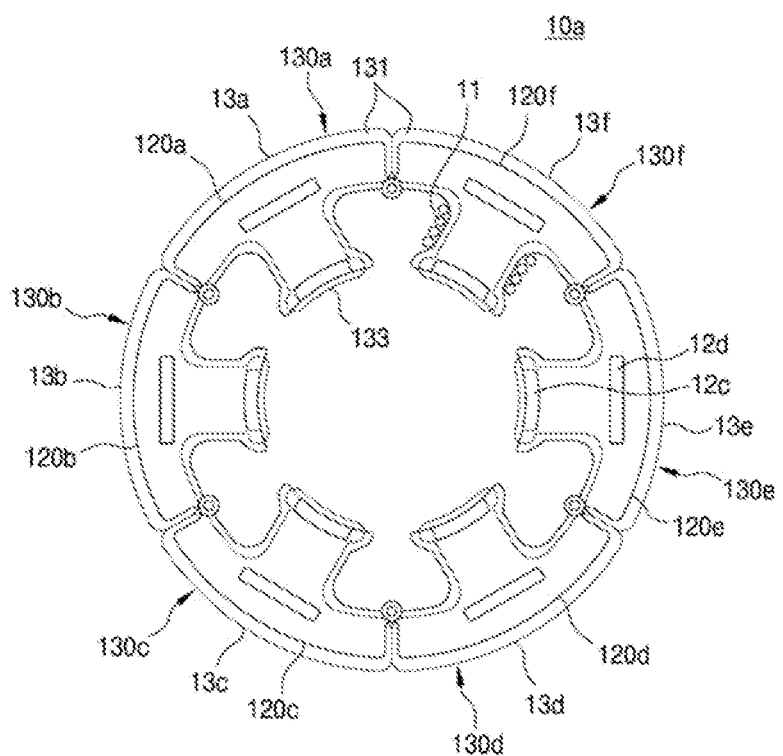
FIGS. 7A and 7B are a schematic plan view and a front view showing a structure where a split type bobbin is combined on a split core type stator core according to a second embodiment of the present invention, respectively.
Figure 7B:
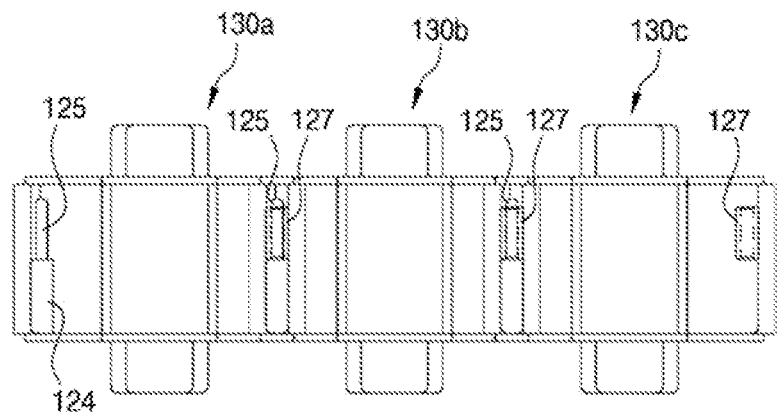
Figure 8A:
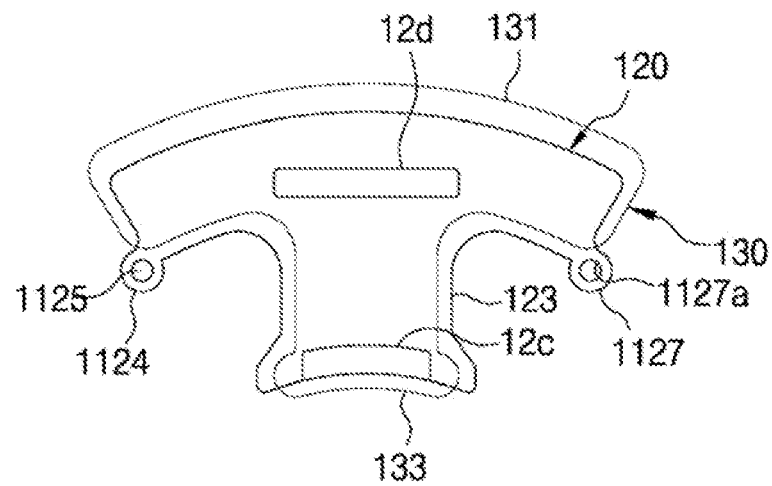
FIGS. 8A and 8B are a plan view and a front view enlarging and showing one of split cores shown in FIG. 7A, respectively.
Figure 8B:
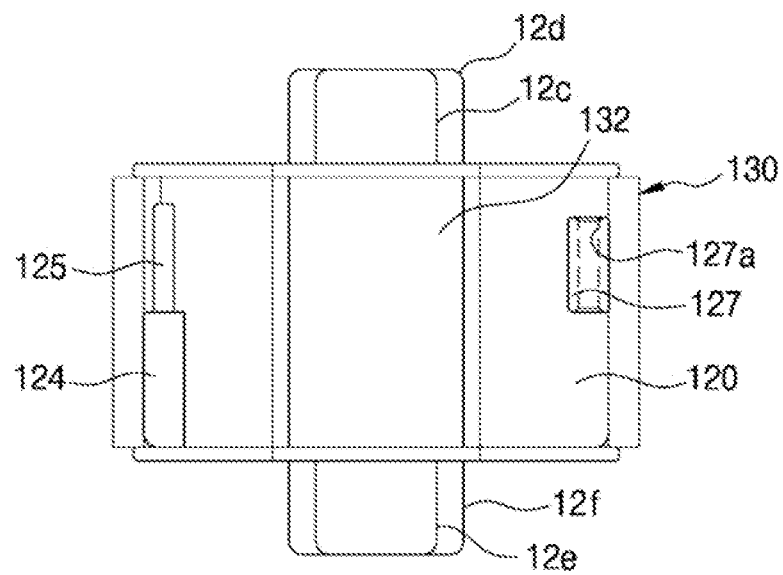

FIGS. 7A and 7B are a schematic plan view and a front view showing a structure where a split type bobbin is combined on a split core type stator core according to a second embodiment of the present invention, respectively. FIGS. 8A and 8B are a plan view and a front view enlarging and showing one of split cores shown in FIG. 7A, respectively.

A split core type stator according to a second embodiment of the present invention is implemented by using a number of unit split cores 13a-13f (or 130) shown in FIGS. 2 to 3B, so as to be used in combination with a single rotor, similarly to the first embodiment.

The stator 10 of the first embodiment is implemented by combining a number of unit split cores 13a-13f (or 130) in an annular form by using integral bobbins 12a and 12b, but the split core type stator 10a according to the second embodiment is implemented by combining a number of unit split core assemblies 130a-130f in an annular form by using split type bobbins 120a-120f (or 120).

In other words, in the unit split core assemblies 130a-130f of the second embodiment, the bobbins 120 are integrally formed by an insert-molding method at each of the outer circumference of the unit split cores 13a-13f (or 130). In this case, the bobbins 120 are not formed at the end of the tooth 133 and on the outer side surface and both side surfaces of the yoke 131.

Also, when the bobbin 120 is integrally formed on the outer circumference of the unit split cores 13a-13f (or 130) by insert molding with resin, a coupling structure is made on both sides of the bobbin 120 so as to enable mutual coupling between adjacent bobbins. To this end, coupling protrusions 125 are extended on base portions 124 in the vertical direction at one side of the bobbin 120, and coupling rings 127 are formed on the upper side at the other side of the bobbin 120, in which insertion holes 127a that are inserted into and combined with the coupling protrusions 125 of the adjacent bobbins 120 are formed in the coupling rings 127.

In the illustrated embodiment, the coupling protrusions 125 and coupling rings 127 are placed in the left and right, but may be possibly placed in the right and left.

Thus, as shown in FIG. 7B, a coupling between the adjacent bobbins 120 is made by combining the coupling protrusion 125 of the unit split core assembly 130a with the hole 127a of the coupling ring 127 of the adjacent unit split core assembly 130b, and then by combining the coupling protrusion 125 of the unit split core assembly 130b with the hole 127a of the coupling ring 127 of the adjacent unit split core assembly 130c, in the same manner, to thereby couple the six unit split core assemblies 130a-130f. Then, an annular assembly structure is completed as shown in FIG. 7A.

In addition, a structure of using the coupling protrusions 125 and coupling rings 127 has been described for a coupling between the adjacent unit split core assemblies 130a-130f in the above-mentioned second embodiment, but it is also possible to have coupling protrusions 125 and coupling rings 127 in the left and right sides of the bobbin 120 to thus complete mutual coupling.

In the case that the unit split core assemblies 130a-130f are temporarily assembled in an annular form as shown in FIG. 7A, the leading end of the coupling protrusions 125 that are exposed to the upper portion of the coupling rings 127 are thermally fused or ultrasonically welded, to then be easily fixed.

In the present invention, prior to the assembly of the six unit split core assemblies 130a-130f, the coil 11 is wound on the coil winding portion 123 of each bobbin 120. In other words, the coil 11 may be sequentially wound by using a one-axis winding machine at the state where the unit split core assemblies 130a-130f are respectively aligned by phases in a linear form by using a connection jig.

After that, the assembled unit split core assemblies 130a-130f form a stator support that surrounds the assembled unit split core assemblies 130a-130f by insert molding using a resin, to thus integrate the remaining portions other than the tooth 132, and to thereby obtain improved durability, noise suppression, and improved sealing properties.

In addition, the assembled unit split core assemblies 130a-130f include coupling protrusions at the lower portion of the bobbin 120 and are assembled by using an annular support bracket, instead of the insert molding, to thus improve durability and achieve a light weight. Since it is not essential to undergo the insert molding with a resin after assembly of the unit split core assemblies 130a-130f, air cooling can be made in spaces between the unit split core assemblies 130a-130f together with achievement of lightweight.

Thus, as mentioned above, each of the unit split core assemblies 130a-130f according to the second embodiment, has a structure that a plurality of unit split cores 13a-13f molded with the amorphous alloy powder are interconnected, to thus minimize leakage of the magnetic flux, and also the unit split core assemblies 130a-130f according to the second embodiment are separated from each other to have a complete split type structure, to thus wind a coil by using an inexpensive general-purpose coil winding machine in the windings for the coil 11 of the unit split core assemblies 130a-130f, and to thereby increase the winding efficiency.

The integral type and split-core type stators 10 and 10a according to the first and second embodiments have been described with respect to a structure of being used in combination with an inner rotor, but if split cores are placed in a form where teeth are protruded outward and an integral type or split-type bobbin is formed in the same manner, the stator may be modified into a stator that can be used in combination with an outer rotor.

In addition, the electric motors according to the first and second embodiments, have been described with respect to the case of being applied in the drive motor for the air suction device of the vacuum cleaner, for example, but may be applicable for various purposes such as the drive devices for hybrid electric vehicles (HEV) as well as electric vehicles, the fan drive devices for cooling radiators for cars or air ventilators, the fan drive devices for cooling batteries, the impeller drive devices for oil pumps, and the drive devices for driving drums of washing machines.

In addition, the integral type and split-core type stators 10 and 10a according to the first and second embodiments have been described with respect to a structure of being used in combination with an inner rotor or an outer rotor, but the present invention is not limited thereto and may be used in combination with a double rotor.

Figure 9:
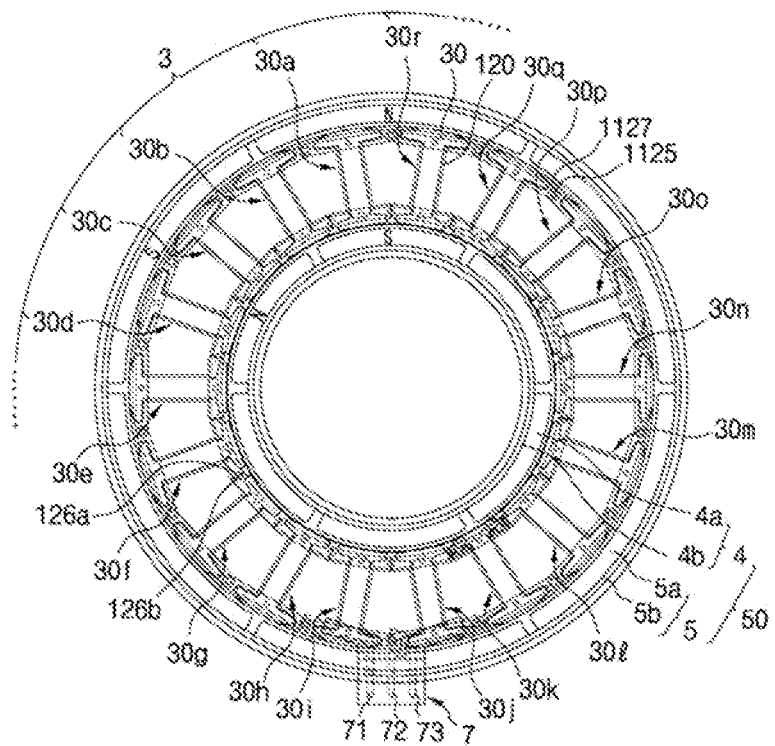
FIG. 9 is a schematic plan view showing an application of a driving motor for a drum or basket of a washing machine, as a brushless direct-current (BLDC) motor including a split core of a stator and a back yoke of a rotor in which a split core type stator and a surface permanent magnet (SPM) type rotor are combined with each other in the motor, and in which the split core of the stator and the back yoke of the rotor are all molded with amorphous alloy powder according to a third embodiment of the present invention.
Figure 10:
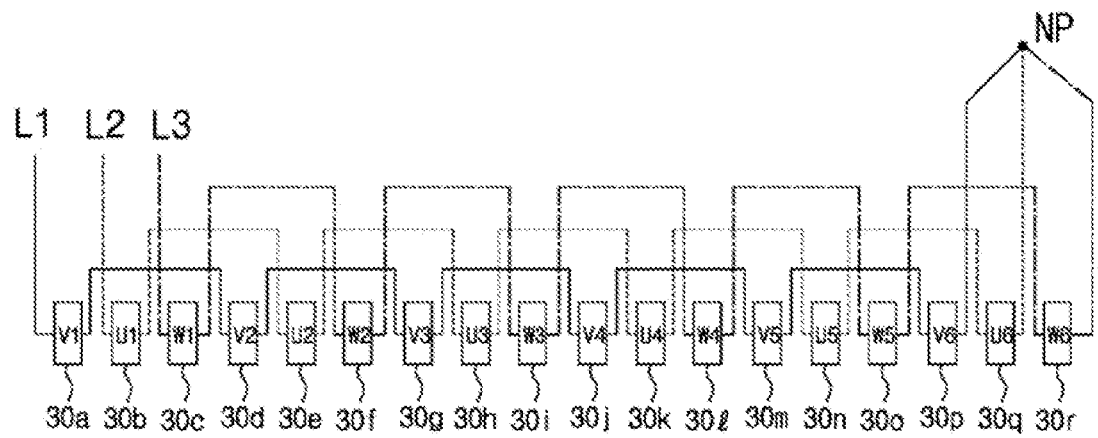
FIG. 10 is a wiring diagram of the motor according to the third embodiment of the present invention with respect to a stator coil.
Figure 11:
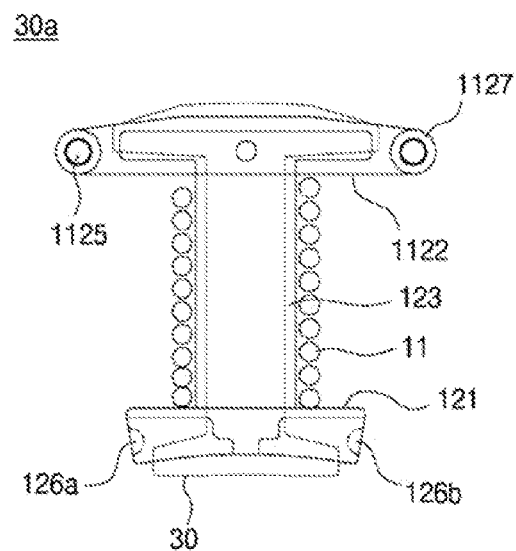
FIG. 11 is a plan view of a unit split core assembly where a bobbin is combined according to the third embodiment.
Figure 12:
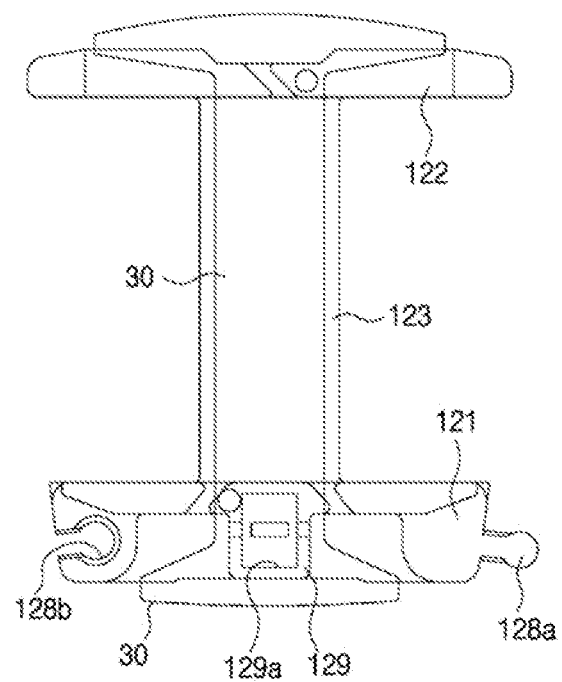
FIG. 12 is a plan view of a unit split core assembly where a modified bobbin is combined.
Figure 13:
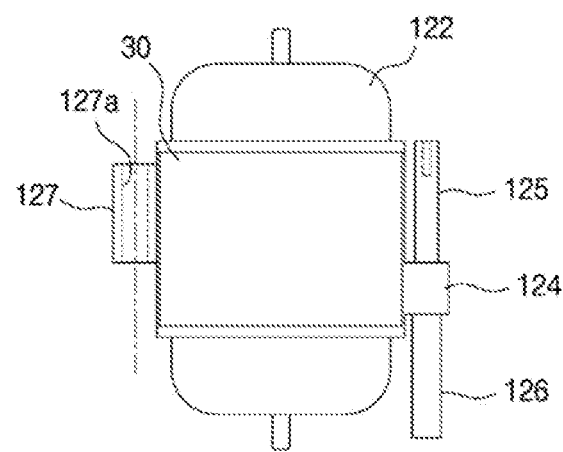
FIG. 13 is a front view showing a unit split core assembly where a bobbin is combined according to the third embodiment.
Figure 14:
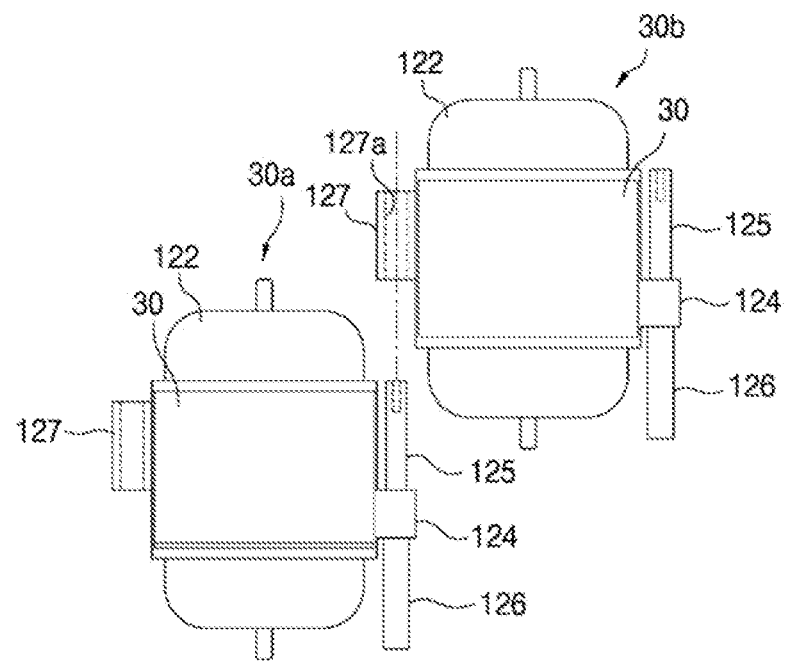
FIG. 14 is a front view for explaining an assembly method between the unit split core assemblies.
Figure 15:
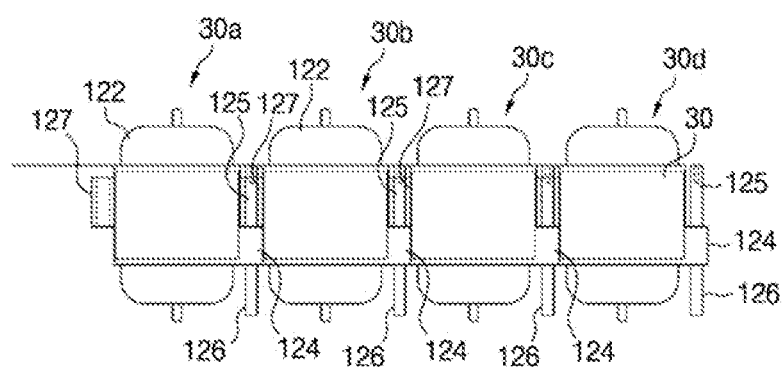
FIG. 15 is a front view showing a state where four unit split core assemblies are assembled.
Figure 16:
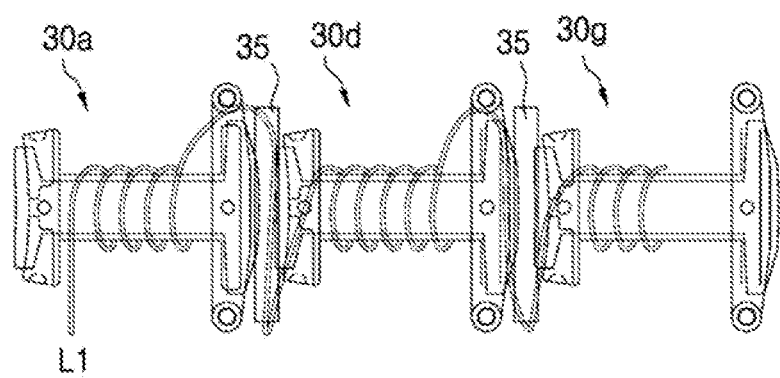
FIGS. 16 and 17 are diagrams showing continuous winding methods for unit split cores, respectively.
Figure 17:
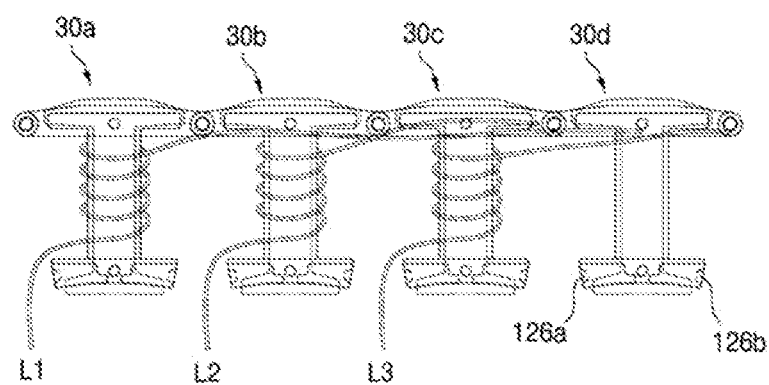
Figure 18:
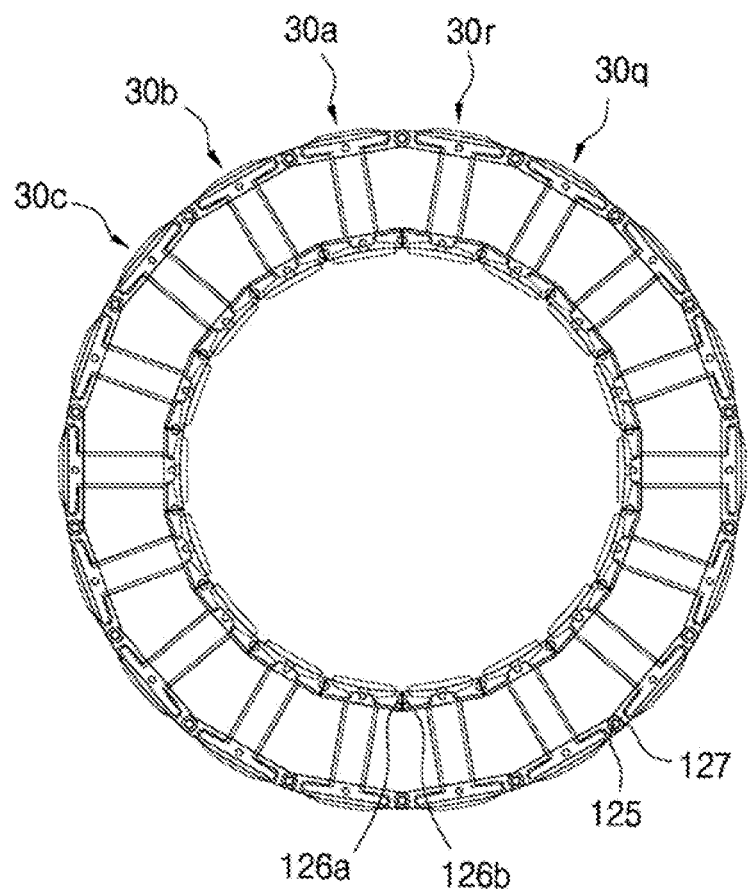
FIG. 18 is a plan view showing a state where a number of unit split core assemblies are temporarily assembled in an annular form.
Figure 19:
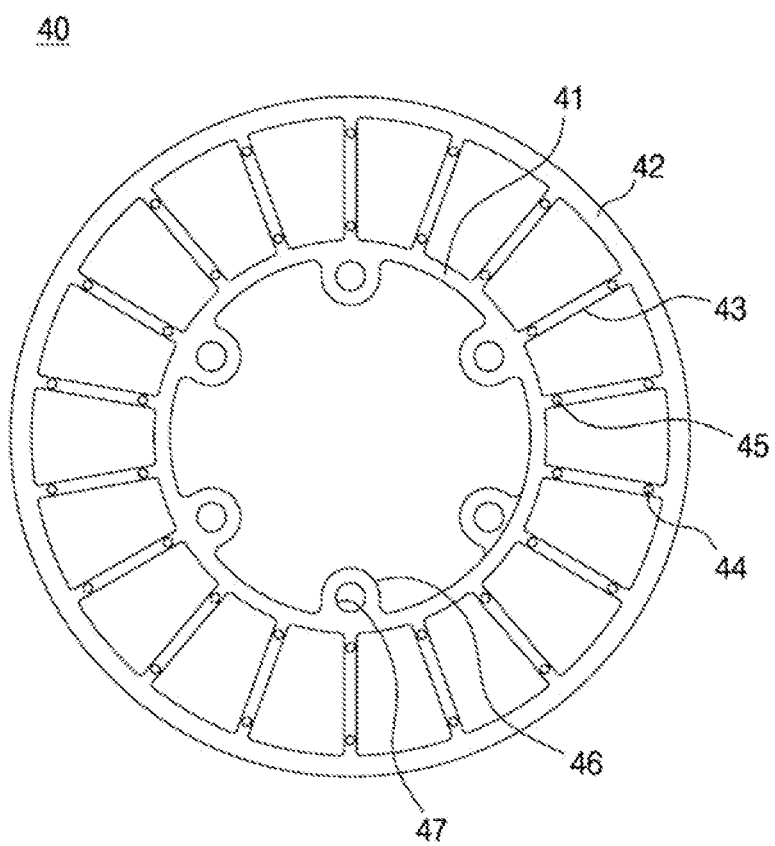
FIG. 19 is a plan view showing a support bracket for fixing the number of unit split core assemblies that are temporarily assembled as shown in FIG. 18.
Figure 20:
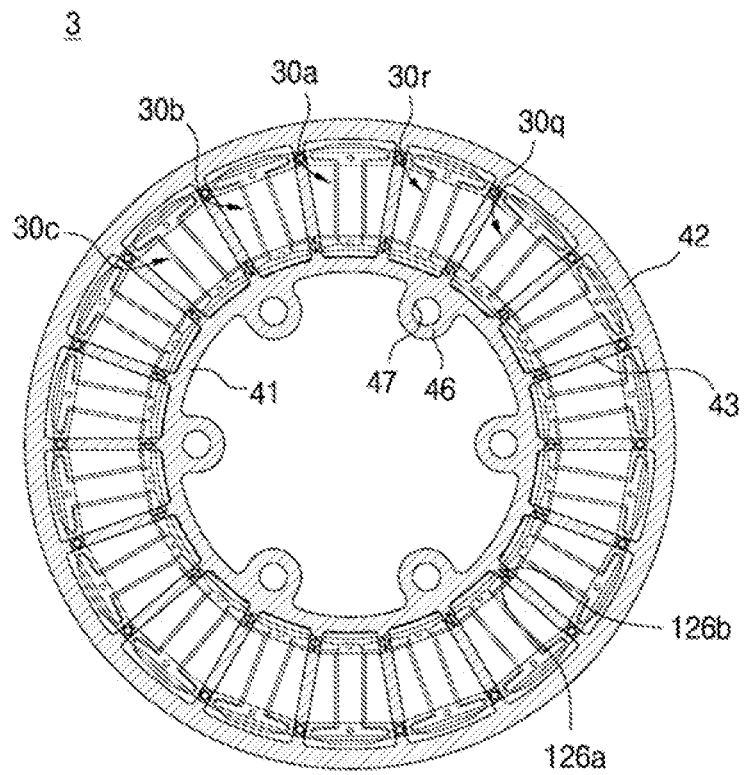
FIG. 20 is a plan view showing a state where the support bracket of FIG. 19 is combined with the number of unit split core assemblies that are temporarily assembled as shown in FIG. 18.
Figure 21:
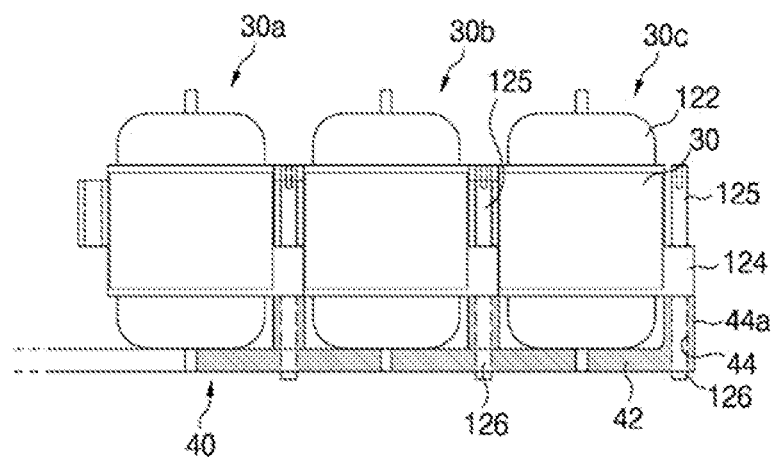
FIG. 21 is a partially cutoff cross-sectional view showing a coupling structure between the support bracket of FIG. 20 and the number of unit split core assemblies.

FIG. 9 is a schematic plan view showing an application of a driving motor for a drum or basket of a washing machine, as a brushless direct-current (BLDC) motor including a split core of a stator and a back yoke of a rotor in which a split core type stator and a surface permanent magnet (SPM) type rotor are combined with each other in the motor, and in which the split core of the stator and the back yoke of the rotor are all molded with amorphous alloy powder according to a third embodiment of the present invention. FIG. 10 is a wiring diagram of the motor according to the third embodiment of the present invention with respect to a stator coil. FIG. 11 is a plan view of a unit split core assembly where a bobbin is combined according to the third embodiment. FIG. 12 is a plan view of a unit split core assembly where a modified bobbin is combined. FIG. 13 is a front view showing a unit split core assembly where a bobbin is combined according to the third embodiment. FIG. 14 is a front view for explaining an assembly method between the unit split core assemblies. FIG. 15 is a front view showing a state where four unit split core assemblies are assembled. FIGS. 16 and 17 are diagrams showing continuous winding methods for unit split cores, respectively. FIG. 18 is a plan view showing a state where a number of unit split core assemblies are temporarily assembled in an annular form. FIG. 19 is a plan view showing a support bracket for fixing the number of unit split core assemblies that are temporarily assembled as shown in FIG. 18. FIG. 20 is a plan view showing a state where the support bracket of FIG. 19 is combined with the number of unit split core assemblies that are temporarily assembled as shown in FIG. 18. FIG. 21 is a partially cutoff cross-sectional view showing a coupling structure between the support bracket of FIG. 20 and the number of unit split core assemblies.

A BLDC (brushless direct-current) motor according to the third embodiment can be implemented into a 6-pole and 18-slot structure as shown in FIG. 9, in the case that the BLDC motor is applied for the drive devices in the washing machines. In this case, the inner rotor 4 and the outer rotor 5 are attached to the inner surface and outer surface of the inner and outer yokes 4b and 5b in which 6-pole magnets 4a and 5a where three N-poles and three S-poles are alternately arranged are place in an annular form, respectively, and the magnets facing each other in the inner rotor 4 and the outer rotor 5 are preferably placed to have the opposite polarity.

An annular stator 3 including eighteen (18) unit split cores 30 has been inserted into an annular space between the double rotor 50 having the inner rotor 4 and the outer rotor 5. The annular stator 3 may be integrated by insert molding with a resin or fixed by using a support bracket 40 combined with the bobbin 20.

The stator 3 of the present invention is manufactured into a split structure as a structure that a number of, for example, eighteen (18) unit split cores 30 are annularly sequentially connected with each other. In this case, when a three-phase drive system is applied thereto, the eighteen (18) unit split cores 30 are divided into six unit split cores 30 for each phase such as U, V, and W.

As shown in FIG. 10, a first coil L1 is continuously wound on six U-phase unit split core assemblies U1-U6 (or 30a, 30d, 30g, 30j, 30m, and 30p) in which a bobbin 120 is formed on the outer circumference of each unit split core 30, a second coil L2 is continuously wound on six V-phase unit split core assemblies V1-V6 (or 30b, 30e, 30h, 30k, 30n, and 30q), and a third coil L3 is continuously wound on six W-phase unit split core assemblies W1-W6 (or 30c, 30f, 30i, 30l, 30o, and 30r).

Eighteen unit split core assemblies 30a-30r that are prepared by six unit split core assemblies for each phase are implemented so that unit split core assemblies U1-U6, V1-V6, and W1-W6 are alternately placed for each phase, and then each one side of the first to third coil L1-L3 wound on each of the unit split core assemblies U1-U6, V1-V6, and W1-W6 is connected with terminal blocks 71-73 of a power block 7, and the other sides of the first to third coil L1-L3 are mutually connected to form a neutral point (NP).

The unit split core assemblies 30a-30r are alternately placed in turn for each phase of U, V, and W, and thus a drive current is switched and sequentially applied to each phase of U, V, and W, the rotors 4 and 5 are rotated.

Hereinbelow, a process of manufacturing the stator 3 which includes the eighteen unit split cores 30 will be described in detail.

The unit split cores 30 of the present invention are obtained by compression molding amorphous alloy powder in an "T"-shaped form, in the same manner as the first embodiment.

After that, as shown in FIGS. 11 and 12, each unit split core 30 is integrally formed with an insulating bobbin 120 on the outer circumference of the unit split core 30 by insert molding using a resin material, for example. In this case, the inner surface and the outer surface of the unit split core 30 opposing the inner and outer rotors 4 and 5 are portions forming a path and a magnetic circuit, and thus no bobbin 120 is formed therein.

The bobbin 120 includes a rectangular coil winding portion 123 on which a coil is wound, and inner and outer flanges 121 and 122 that are bent and extended at the inner and outer sides of the coil winding portion 123 and defines a coil winding area, in which the coil winding portion 123 between these flanges 121 and 122 is a space where the coil 11 may be wound.

In the case of the unit split core 30, the inner and outer flanges 121 and 122 are bent and extended at the inner and outer sides of the body in the form of a straight line, and it is preferable that the inner flange is rounded inward and the outer flange is rounded outward, so as to keep regular intervals from the annular inner and outer rotors 4 and 5. In this case, the outer flange is preferably formed to be relatively larger than the inner flange.

In addition, the assembly between the unit split core 30 and the bobbin 120 is preferably integrally molded by an insert molding method using a thermosetting resin, but the present invention is not limited thereto and may be assembled in well-known different ways.

The inner and outer flanges 121 and 122 of the bobbin 120 are implemented so that the outer flange 122 is preferably formed to be relatively larger than the inner flange 121, and a wiring box 129 (see FIG. 12) for mutually connecting terminal blocks 71-73 of the power block 7 with each one end of the first to third coils L1-L3 may be provided at the center of the inner or outer flange 121 or 122 of the bobbin.

In addition, a coupling structure for mutually combining the unit split core assemblies 30a-30r on which the coil 11 is wound and temporarily assembling them in an annular form is integrally formed at the left and right sides of the outer flange 122.

In other words, as shown in FIGS. 11 and 13, first and second coupling protrusions 125 and 126 are extended at the upper and lower sides from the base portion 124 on the left side of the outer flange 122, respectively, and a circular coupling ring 127 through which the first coupling protrusion 125 is inserted is provided on the right side of the outer flange 122. In FIG. 13, the positions of the first and second coupling protrusions 125 and 126 and the coupling ring 127 are opposed to those of FIG. 11.

In the embodiment illustrated in FIG. 11, the first and second coupling protrusions 125 and 126 and the coupling ring 127 are placed at the left and right sides of the outer flange 122. However, as illustrated in FIG. 13, the first and second coupling protrusions 125 and 126 and the coupling ring 127 are possibly placed at the right and left sides of the outer flange 122, or at the left and right sides of the inner flange 121 of the bobbin 120.

In addition, when the unit split core assemblies 30a-30r are mutually combined and temporarily assembled in an annular form as shown in FIG. 18, and then the unit split core assemblies 30a-30r that are assembled as shown in FIG. 20 are fixed by the support bracket 40, a second coupling protrusion 126 and a pair of third coupling protrusions 126a and 126b that are protruded at the lower sides from the inner and outer flanges 121 and 122 of the bobbin 120 are used.

In other words, as shown in FIGS. 9 and 11, the second coupling protrusion 126 is extended in the opposite direction to the first coupling protrusion 125 at the outer flange 122, so as to secure the outer end of the bobbin 120 to the support bracket 40, and the pair of third coupling protrusions 126a and 126b are extended at the lower side in the left and right sides of the inner flange 121, so as to secure the inner end of the bobbin 120 to the support bracket 40. The pair of third coupling protrusions 126a and 126b are of a half-structure circular cylinder shape so as to form a complete circular cylinder in combination with the third coupling protrusions 126a and 126b that are formed in the bobbin 120 of the adjacent unit core assembly during assembling.

Thus, as shown in FIGS. 14 and 15, a coupling between the adjacent bobbins 120 is made by combining the coupling protrusion 125 of the unit split core assembly 30a with the hole 127a of the coupling ring 127 of the adjacent unit split core assembly 30b, and then by combining the coupling protrusion 125 of the unit split core assembly 30b with the hole 127a of the coupling ring 127 of the adjacent unit split core assembly 30c, in the same manner, to thereby sequentially couple the eighteen unit split core assemblies 30a-30r. Then, an annular temporary assembly structure is completed as shown in FIG. 18.

In addition, a structure of using the first coupling protrusion 125 and coupling ring 127 has been described for a coupling between the adjacent unit split core assemblies 30a and 30b in the above-mentioned embodiment, but it is also possible to have a coupling protrusion 128b and a coupling recess 128b in the left and right sides of the inner flange 121 of the bobbin 120, respectively, to thus complete mutual coupling. In this case, it is possible to form the coupling protrusion 128b and the coupling recess 128b at the left and right sides of the outer flange 122 of the bobbin 120, instead of forming the coupling protrusion 128b and the coupling recess 128b at the left and right sides of the inner flange 121 of the bobbin 120.

Moreover, it is possible to use any combination structure to perform the coupling between the adjacent unit split core assemblies 30a and 30b, and it is also possible to adopt a different approach as a coupling structure between the bobbin 120 and the support bracket 40. For example, it is also possible to form a coupling protrusion of the bobbin for the combination of the support bracket 40 at a different place of the inner flange 121 or the outer flange 122, as well as at the lower end of the coupling protrusion 128a.

The bobbin 120 shown in FIG. 12 is integrally provided with a wiring box 129 that can simply handle a mutual connection with terminals of the coil wound on the adjacent bobbin, or a connection with terminal blocks of the power block. The wiring box 129 is configured to perform the electrical connection by inserting two coil terminals requiring a connection, for example, from the side surface thereof and then inserting a mag mate terminal in the form of elastic clips into a wiring box 129a.

In FIG. 9, the terminal blocks 71-73 of the power block 7 and each one side end of the first to third coils L1-L3 are interconnected by using the wiring box 129. In other words, the mag mate terminal is provided at the inner distal end of the terminal blocks 71-73 in the form of elastic clips, to thus simply enable the connection with the first to third coils L1-L3.

The structure of connecting the terminal blocks 71-73 and the first to third coils L1-L3 promotes slimming of the stator 3, to thus make it possible to mount a drum drive device of a drum washing machine on a tub by a direct drive and to thereby contribute an increase in a washing capacity of the washing machine through the slimming of the stator 3.

In the present invention, prior to the assembly of the eighteen unit split core assemblies 30a-30r, the first to third coils 11 (or L1-L3) are wound on the coil winding portion 123 of each bobbin 120. In other words, first to third coils 11 (or L1-L3) may be sequentially wound by using a one-axis winding machine at the state where the six unit split core assemblies U1-U6, V1-V6, and W1-W6 are respectively aligned by phases in a linear form by using five connection jigs 35, as shown in FIG. 16.

In this case, when, for example, U-phase unit split core assemblies U1-U6 (or 30a, 30d, 30g, 30j, 30m, and 30p) are continuously wound, it is preferable to execute windings in the connection jig 35 a number of times, so as to form long connections by considering the spacing between the unit split core assemblies U1-U6 (or 30a, 30d, 30g, 30j, 30m, and 30p).

In addition, as shown in FIG. 17, as a method of winding the first to third coils 11 (or L1-L3) on the bobbin 120, it is possible to sequentially wind a number of unit split core assemblies U1-U6, V1-V6, and W1-W6, by using a multi-axis, for example, a three-axis winding machine. In this case, the eighteen unit split core assemblies U1-U6, V1-V6, and W1-W6 are implemented by sequentially winding six unit split core assemblies U1-U6, V1-V6, or W1-W6, respectively, or winding, for example, two or three unit split core assemblies for each phase and then mutually connecting the coil terminals of the adjacent unit split core assemblies 30a, 30d, 30g, 30j, 30m, and 30p in the case of the U-phase, by using the wiring box 129 included in the central portion of the inner or outer flange 121 or 122 of the bobbin for each phase.

As described above, the first to third coils 11 (or L1-L3) are wound on the bobbin 120 of the six unit split core assemblies U1-U6, V1-V6, and W1-W6, respectively, to thus prepare three sets of unit split core assemblies U1-U6, V1-V6, and W1-W6 in the case of three phases, and then the unit split core assemblies U1-U6, V1-V6, and W1-W6 of each phase U, V or W are combined as shown in FIG. 14, at a state where the unit split core assemblies U1-U6, V1-V6, and W1-W6 are alternately placed in turn by phases, respectively as shown in FIGS. 9 and 10, to thus obtain eighteen unit split core assemblies 30a-30r that are temporarily assembled in an annular form as shown in FIG. 18.

For the convenience of description, FIG. 18 shows the coil 11 wound on the bobbin 120 has been removed.

After that, as shown in FIGS. 20 and 21, the temporarily assembled unit split core assemblies 30a-30r are completed to achieve fixing of a number of unit split core assemblies 30a-30r when an annular support bracket 40 is assembled with a second coupling protrusion 126 and a pair of third coupling protrusions 126a and 126b that are extended at the lower side of the bobbin 120.

To this end, as shown in FIG. 19, the support bracket 40 includes: an inner ring 41 and an outer ring 42; and a number of connecting links 43 that are radially disposed at a distance to connect the inner ring 41 and the outer ring 42, in which a boss 44a at the central portion of which throughholes 44 and 45 are formed at portions corresponding to the second coupling protrusion 126 and a pair of third coupling protrusions 126a and 126b are protruded from each connecting link 43.

When the support bracket 40 is assembled with the unit split core assemblies 30a-30r, the second coupling protrusion 126 passes through the throughhole 44 of the boss 44a and a part of the leading end portion thereof is preferably protruded at the lower side of the support bracket 40. For mutually fixing the unit split core assemblies 30a-30r and the support bracket 40, the second coupling protrusion 126 that is protruded at the lower side of the support bracket 40 is ultrasonically welded or thermally fused.

In addition, a pair of third coupling protrusions 26a and 26b that are provided in the adjacent bobbin are assembled together with the boss formed in the throughhole 45 of the support bracket 40, and then the leading end portion that is protruded at the lower side of the support bracket 40 is fused to then be fixed to the support bracket 40 so that the front end of the bobbin 120 is fixed to the support bracket 40.

Moreover, in the embodiment shown in FIG. 21, when the unit split core assemblies 30a-30r and the support bracket 40 are assembled with each other, the boss 44a with which the second and third protrusions 26 (or 26a and 26b) are coupled is preferably integrally formed with the support bracket 40, in order to reinforce a coupling fixation force and minimize noise, but the present invention is not limited thereto. In other words, if the leading end portions of the second and third protrusions 26 (or 26a and 26b) are fixed to the support bracket 40 at a state where the leading and trailing edges of the bobbin is partially supported by the support bracket 40, when the unit split core assemblies 30a-30r and the are assembled with each other, a sufficient fixing may be performed even if the boss 44a is omitted.

On the other hand, the support bracket 40 is preferably made of a metallic material with a lightweight yet rigid, for example, aluminum (Al). The support bracket 40 may be also possibly manufactured by using a synthetic resin.

In addition, in preparation for the case where the second coupling protrusion 126 is placed at the left or right side of the inner flange 121, each of the connecting links 43 may possibly include a boss at the central portion of which another throughhole 45 is provided at the adjacent portion to the inner ring 41.

Moreover, a circular protrusion 46 including a number of fixing holes 47 for fixing the stator 3 to a housing or tub of a washing machine, for example, by using fixing bolts or fixing screws, is protruded from the inner ring 41. As needed, instead of the inner ring 41, the circular protrusion 46 is possibly protruded from the outer ring 42.

When the temporarily assembled unit split core assemblies 30a-30r are placed in the space between a large number of connecting links 43 of the support bracket 40 as shown in FIG. 20, respectively, the second coupling protrusion 126 is inserted into the throughhole 44 of each connecting link 43 and a pair of third coupling protrusions 126a and 126b are inserted into the throughhole 45, together.

After that, when the second and third coupling protrusions 26 (or 126a and 126b) that are protruded at the lower side of the support bracket 40 are ultrasonically welded or thermally fused, the unit split core assemblies 30a-30r and the support bracket 40 are mutually fixed to each other.

As mentioned above, in the present invention, a coil 11 (or L1-L3) is sequentially wound on a number of unit split cores 30, and a coupling is fixedly coupled between the adjacent bobbin 120, to thus exclude an integral injection molding by insert-molding, and to thereby promote lightweight, slimming, and improvement of assembly productivity of the stator.

In addition, in the motor of the present invention, a number of split cores on which the coil 11 is wound, that is, the unit split core assemblies 30a-30r are fixed by using the support bracket 40, to thus exclude an integral injection molding by insert-molding, and to thereby make the heat generated from the stator coil 11 easily discharged to the outside.

Moreover, in the present invention, cooling vents and ribs 51a perpendicular to the circumferential direction are formed in a rotor support 51 that connects inner and outer rotors 4 and 5, and thus a large amount of wind is generated during rotation of the rotors 4 and 5, to thus form vortices, and to thereby effectively cool the heat generated from the rotors 4 and 5 and the stators 10b and 10c (see FIG. 22 or 23 to be described later).

Figure 22:
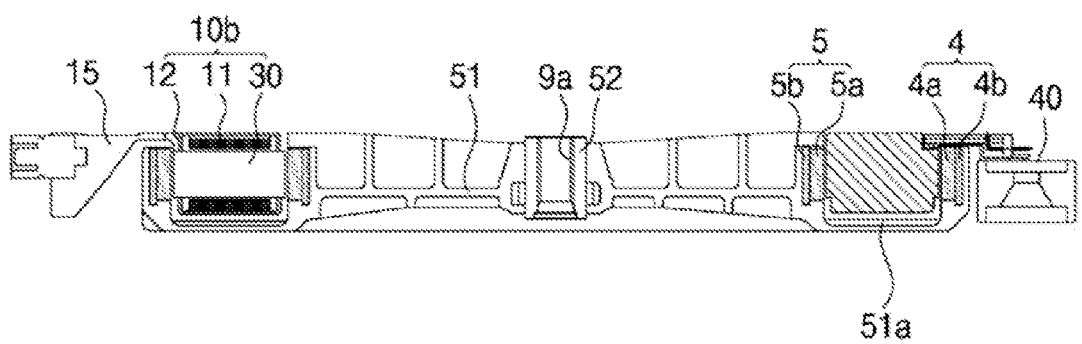
FIG. 22 is an axial cross-sectional view showing an application where the motor according to the third embodiment of the present invention shown in FIG. 9 is applied for a slim type driving device for a drum type washing machine.

FIG. 22 is an axial cross-sectional view showing an application where the motor according to the third embodiment of the present invention shown in FIG. 9 is applied for a slim type driving device for a drum type washing machine. FIG. 23 is an axial cross-sectional view showing an application where the motor employing a modified unit split core shown in FIG. 22 is applied for a slim type driving device for a drum type washing machine.

Similarly to the third embodiment, a slim type drive device for a drum type washing machine shown in FIG. 22 can be implemented into a 6-pole and 18-slot structure, which includes a double rotor 50 in which magnets facing each other in an inner rotor 4 and an outer rotor 5 are preferably placed to have the opposite polarity, and an annular stator 10b that are disposed in an annular space between the inner rotor 4 and the outer rotor 5 and includes eighteen (18) unit split cores 30.

In this case, the inner rotor 4 and the outer rotor 5 are preferably attached to the inner surface and outer surface of the inner and outer yokes 4b and 5b in which 6-pole magnets 4a and 5a where three N-poles and three S-poles are alternately arranged are place in an annular form, respectively.

The annular stator 10b may be integrated by insert molding the eighteen (18) unit split cores 30 with a resin, or fixed by using the support bracket 40 combined with the bobbin 20.

The stator 10b of the present invention is manufactured into a split structure as a structure that a number of, for example, eighteen (18) unit split cores 30 are annularly sequentially connected with each other. In this case, when a three-phase drive system is applied thereto, the eighteen (18) unit split cores 30 are divided into six unit split cores 30 for each phase such as U, V, and W. The stator 10b may be formed of the same structure as that of the third embodiment, and thus the detailed description is omitted.

The motor for the slim type drive device of the drum type washing machine that includes the double rotor 50 and the stator 10b shown in FIG. 22, is configured to have a structure that the double rotor 50 is placed on the inner side and the stator 10b is disposed at the outside of the double rotor 50.

Cooling vents and ribs 51a perpendicular to the circumferential direction are formed in a rotor support 51 that connects inner and outer rotors 4 and 5, and thus a large amount of wind is generated during rotation of the double rotor 50, to thus form vortices, and to thereby effectively cool the heat generated from the rotors 4 and 5 and the stator 10b. In addition, a bushing 52 is integrally formed at the central portion of the rotor support 51, in which a coupling hole 9a through which a rotating shaft 9 is combined is formed in the bushing 52.

The central portion of the stator 10b is open to advantageously radiate the heat of the stator 10b so as to be coupled from the outside of the double rotor 50, and a number of mounting holes 40 for being coupled to the tub of the drum type washing machine are formed at the outside of a stator support 15 that is extended outward from the stator 10b.

The mounting structure of the stator 10b may increase the height of the core by 20% or more, to thus improve the performance, and increase the heat dissipation effect due to the exposure of the inner and outer surfaces of the core.

In addition, in the present invention, the rotor 50 and the stator 10b may be provided in an integral type. This structure does not cause the interference of the rotor 50 since the mounting holes are provided on the outside to thus conveniently tighten bolts.

This structure may be applied to full-automatic washing machines whose driving shafts are vertical, as well as to drum type washing machines whose driving shafts are horizontal.

The double rotor 50 in the motor for the slim type drive device of the drum type washing machine shown in FIG. 22 is configured to have the same magnetic circuit as that of the third embodiment, and thus the detailed description will be omitted.

The unit split cores 30 of the stator 10b are molded with amorphous alloy powder in the same manner as that of the third embodiment shown in FIG. 9, in which inner and outer flanges are disposed at the inner and outer sides of the stator 10b, to respectively face the inner and outer rotors 4 and 5, and connection portions are disposed perpendicularly to the inner and outer flanges, to thus form an "I"-shape as a whole.

In this case, the heights of the inner and outer flanges in the unit split core 30 are set in the same manner as those of the permanent magnets 4a and 5a of the opposing inner and outer rotors 4 and 5, to thus minimize the leakage of the magnetic flux generated from the permanent magnets 4a and 5a, and to thereby promote an increase in the motor efficiency.

Figure 23:
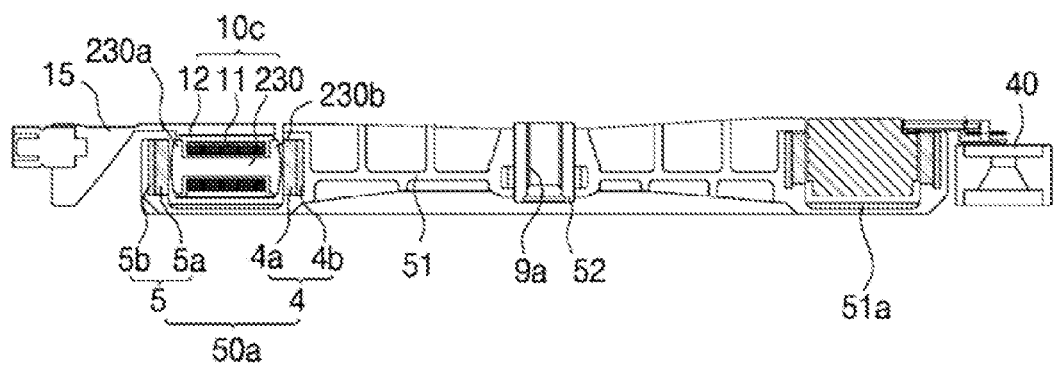
FIG. 23 is an axial cross-sectional view showing an application where the motor employing a modified unit split core shown in FIG. 22 is applied for a slim type driving device for a drum type washing machine.

On the other hand, the motor shown in FIG. 23 includes a double rotor 50a and a stator 10c containing a number of unit split cores 230.

The motor shown in FIG. 23 is substantially the same as the motor for the slim type drive device of the drum type washing machine shown in FIG. 22, but the former differs from the latter in terms of an alignment shape of the unit split cores 230 of the stator 10c.

In the unit split cores 230 of the stator 10c the motor shown in FIG. 23, inner and outer flanges 230b and 230a are disposed at the inner and outer sides of the stator 10c, to respectively face the inner and outer rotors 4 and 5, and connection portions are disposed horizontally with the inner and outer flanges 230b and 230a, to thus form an "I"-shape as a whole.

In other words, the unit split cores 230 of the stator 10c are disposed by turning the unit split cores 30 of the stator 10b by 90°. In this case, the heights of the inner and outer flanges 230b and 230a in the unit split core 230 are set in the same manner as those of the permanent magnets 4a and 5a of the opposing inner and outer rotors 4 and 5, to thus minimize the leakage of the magnetic flux generated from the permanent magnets 4a and 5a, and to thereby promote an increase in the motor efficiency.

The basket drive device of the drum type washing machine shown in FIGS. 22 and 23, that is, the motor is used as a direct drive, in which the outer circumference of the stators 10b and 10c are attached to the tub of the washing machine, and the intermediate portion of the rotating shaft 9 combined at the center of the double rotors 50 and 50a is rotatably supported by the tub and simultaneously the leading end portion thereof is combined with the basket or drum.

In the above described embodiment of the present invention, the motor according to the present invention has been described with respect to the case that the rotor and stator are disposed as a radial type for example, but the present invention is not limited thereto and may be also applied to the case that the rotor and stator are disposed facing each other as an axial type.

Meanwhile, when an amorphous alloy material is made to operate at a frequency band of at least 10 kHz or higher, the permeability characteristics may be used at maximum. Taking this into consideration, in the present invention, the number of poles for the rotor 50 or 50a of the motor is set as shown in Equation 1.

$$F = P * N/120 \qquad \text{[Equation 1]}$$

Here, F represents a rotational frequency, P the number of poles of the rotor, and N the rpm of the rotor.

Assuming that a motor operates at 50,000 rpm at a rotational frequency of 10 kHz, in the present invention, the number of desired poles is obtained as 24 poles. The rotor 50 or 50a or 200 respectively disclosed in the first to third embodiments is modified to have a 24-pole structure, and the motor may be designed to have a 24-pole-18-slot structure.

In the present invention, the back yoke used for the rotor 50 or 50a of the motor and the core 13, 13a-13f, 30, 130, or 230 used for the stator 3, or 10-10c of the motor are prepared by sintering the amorphous alloy powder, thereby minimizing a core loss and at the same time optimizing the number of poles of the rotor in an operating frequency band of 10 kHz or higher, at the time of designing and thereby maximizing the permeability characteristics.

Thus, even if the electric motor according to the present invention is applied for a drive system for electric vehicles which require a high output of 100 kW or larger, it is possible to employ the electric motor according to the present invention for an in-wheel motor structure drive system, since the electric motor according to the present invention may be implemented into a miniaturized size.

In addition, in the present invention, amorphous metal materials are powdered and are compressed and molded into split cores, to thus easily mold core components of a complex shape, to thus minimize a core loss, to thus promote improvement of an efficiency of the motor, and to thereby implement an amorphous alloy powder core for use in a high-power, high-speed electric motor.

In addition, the present invention provides an electric motor in which split cores are coupled to each other by using an amorphous alloy powder core without increasing magnetoresistance, wherein hinge-coupling is done between adjacent bobbins, to thus employ the split cores even in a single-stator and single-rotor structure and to thus promote effectiveness of coil windings, and minimize the size and weight of the electric motor.

In addition, the electric motor according to the present invention may be applied to driving devices for electric vehicles, as well as to driving devices for hybrid type electric vehicles (HEV).

Furthermore, the electric motor according to the present invention may be applied as a generator.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention is applied to the technology of easily molding a core of a complex shape by compressing and molding a number of unit split cores with amorphous alloy powder and assembling the number of unit split cores by using bobbins, and minimizing a core loss by using the amorphous powder, to thus promote improvement of an efficiency of the motor, and can be applied to stators and electric motors for use in driving devices for hybrid type electric vehicles (HEV), as well as driving devices for electric vehicles using high-power, high-speed electric motors.

The invention claimed is:

1. An amorphous stator for use in an electric motor, the amorphous stator comprising:
   a number of unit split core assemblies that are temporarily assembled in an annular form; and
   an annular support bracket that are coupled at one side surface of the number of the assembled unit split core assemblies, to thus fix the number of the unit split core assemblies,
   wherein each of the number of unit split core assemblies comprises:
   a number of unit split cores that are made in an "I"-shape by compression molding amorphous alloy powder;
   a number of insulating bobbins that comprise inner and outer flanges that are formed in the outer periphery of the number of unit split cores, to thus define a coil winding area, in which a first coupling protrusion and a coupling ring that are formed at both ends of the outer flange interconnect with each other to then be assembled in an annular form, and that are fixed to the outer side of the annular support bracket by a second coupling protrusion that extends in a direction opposed to the first coupling protrusion and fixed to the inner side of the annular support bracket by a pair of third coupling protrusions that are formed at both sides of the inner flange; and
   a coil that is wound on the coil winding area of the insulating bobbins.

2. The amorphous stator for use in an electric motor, according to claim 1, wherein the annular support bracket comprises:
   an inner ring and an outer ring that are arranged in a concentric circle of different diameters; and
   a number of connecting links that are radially disposed at a distance to connect the inner ring and the outer ring, and
   wherein each connecting link comprises: a first throughhole through which the second coupling protrusions are inserted and combined; and a pair of second throughhole through which a pair of third coupling protrusions are inserted and combined.

3. The amorphous stator for use in an electric motor, according to claim 2, wherein a boss at the center portion of which a throughhole is formed protrudes at the first and second throughholes of the connecting links, and
   the second and third coupling protrusions are coupled to the bosses of the annular support bracket and the distal ends thereof are ultrasonically fused or thermally fused.

4. The amorphous stator for use in an electric motor, according to claim 1, wherein the bobbin comprises:
   a first coupling protrusion formed on one side of the outer flange;
   a coupling ring formed on the other side of the outer flange and coupled to the first coupling protrusion of the adjacent bobbin;
   a second coupling protrusion that extends in opposition to the first coupling protrusion and whose distal end is fixed to the annular support bracket; and
   a pair of third coupling protrusions formed at one and other sides of the inner flange and whose distal ends are fixed to the annular support bracket.

5. The amorphous stator for use in an electric motor, according to claim 1, wherein the number of unit split cores are molded by a mixture of plate-shaped amorphous alloy powder and spherical soft magnetic powder, to thus promote improved permeability and improved packing density.

* * * * *